US010975525B2

(12) United States Patent
Cimpeanu et al.

(10) Patent No.: US 10,975,525 B2
(45) Date of Patent: Apr. 13, 2021

(54) FINELY DIVIDED, CATIONIC, AQUEOUS POLYMER DISPERSIONS, METHOD FOR THE PRODUCTION THEREOF, AND THE USE THEREOF

(71) Applicant: SOLENIS TECHNOLOGIES, L.P., Wilmington, DE (US)

(72) Inventors: Carmen-Elena Cimpeanu, Ludwigshafen (DE); Klaus Moeller, Mutterstadt (DE); Petra Arnold, Birkenau (DE); Kristina Georgieva, Mannheim (DE); Reinhold Dieing, Speyer (DE); Christian Jehn-Rendu, Eppelheim (DE); Quan Wen, Shanghai (CN)

(73) Assignee: SOLENIS TECHNOLOGIES, L.P., Wilmington, DE (US)

( * ) Notice: Subject to any disclaimer, the term of this patent is extended or adjusted under 35 U.S.C. 154(b) by 197 days.

(21) Appl. No.: 15/780,279

(22) PCT Filed: Dec. 1, 2016

(86) PCT No.: PCT/EP2016/079365
§ 371 (c)(1),
(2) Date: May 31, 2018

(87) PCT Pub. No.: WO2017/093368
PCT Pub. Date: Jun. 8, 2017

(65) Prior Publication Data
US 2018/0355558 A1 Dec. 13, 2018

(30) Foreign Application Priority Data
Dec. 1, 2015 (EP) ..................................... 15197224

(51) Int. Cl.
| | | |
|---|---|---|
| *D21H 21/16* | (2006.01) | |
| *C08F 212/08* | (2006.01) | |
| *C08F 220/14* | (2006.01) | |
| *C08F 220/44* | (2006.01) | |
| *C08F 2/30* | (2006.01) | |
| *C08F 26/06* | (2006.01) | |
| *D21H 17/45* | (2006.01) | |
| *C08F 226/06* | (2006.01) | |
| *D21H 17/37* | (2006.01) | |
| *D21H 17/35* | (2006.01) | |
| *C08F 220/34* | (2006.01) | |
| *C08F 2/28* | (2006.01) | |

(Continued)

(52) U.S. Cl.
CPC ............... *D21H 21/16* (2013.01); *C08F 2/28* (2013.01); *C08F 2/30* (2013.01); *C08F 26/06* (2013.01);
(Continued)

(58) Field of Classification Search
CPC ...... C08F 220/44; C08F 2/28; C08F 2800/20; C09D 125/08; C09D 125/12
See application file for complete search history.

(56) References Cited

U.S. PATENT DOCUMENTS

| 3,174,874 A | 3/1965 | Fikentscher et al. |
|---|---|---|
| 4,051,093 A * | 9/1977 | Wendel ................ C08F 212/08 |
| | | 524/812 |

(Continued)

FOREIGN PATENT DOCUMENTS

| CN | 101871184 A | 10/2010 |
|---|---|---|
| CN | 102086614 A | 6/2011 |

(Continued)

OTHER PUBLICATIONS

U.S. Appl. No. 15/537,538, filed Jun. 19, 2017, US 2017-0369604 A1, Carmen-Elena Cimpeanu.
(Continued)

*Primary Examiner* — Michael A Salvitti
(74) *Attorney, Agent, or Firm* — Lorenz & Kopf, LLP

(57) ABSTRACT

Finely divided, cationic, aqueous polymer dispersion which is obtainable by emulsion polymerisation of ethylenically unsaturated monomers in an aqueous liquid containing a cationic prepolymer as a dispersant, wherein the cationic prepolymer is prepared in the presence of at least one polymerisation initiator by polymerisation of (a) from 15 to 45% by weight of at least one ethylenically unsaturated monomer comprising at least one quaternary ammonium group; (b) from 5 to 80% by weight of at least one optionally substituted styrene; (c) from 0 to 50% by weight of at least one C 1-12 alkyl (meth) acrylate; (d) from 0 to 10% by weight of at least one ethylenically unsaturated monomer comprising an acid group; (e) from 0 to 10% by weight of at least one ethylenically unsaturated monomer comprising an amine group; and (f) from 0 to 20% by weight of at least one non-ionic ethylenically unsaturated monomer differing from (b), (c) and (e), the sum of (a)+(b)+(c)+(d)+(e)+(f) being 100% by weight, in a first emulsion polymerisation in the presence of at least one non-ionic emulsifier, and thereafter, in the aqueous liquid containing the cationic prepolymer a second emulsion polymerisation is carried out, in the presence of at least one polymerisation initiator, of a monomer mixture comprising (i) from 10 to 70% by weight of at least one of an optionally substituted styrene or (meth) acrylonitrile; (ii) from 30 to 90% by weight of at least one CMS alkyl (meth) acrylate; (iii) from 0 to 30% by weight of at least one vinyl ester of linear or branched $C_{1-30}$ carboxylic acids; and (iv) from 0 to 30% by weight of at least one non-ionic ethylenically unsaturated monomer differing from (i), (ii) and (iii), the sum of (i)+(ii)+(iii)+(iv) being 100% by weight, and the first emulsion polymerisation and/or the second emulsion polymerisation is optionally carried out in the presence of from 0 to 10% by weight of at least one polymerisation regulator. The polymer dispersions according to the present invention are suitable for use as sizing agents for paper, board and card board.

11 Claims, No Drawings

(51) Int. Cl.
| | |
|---|---|
| *C08F 212/10* | (2006.01) |
| *C08F 220/46* | (2006.01) |
| *C09D 5/02* | (2006.01) |
| *C09D 125/08* | (2006.01) |
| *C09D 125/12* | (2006.01) |
| *C09D 125/14* | (2006.01) |
| *C09D 133/10* | (2006.01) |
| *C09D 133/20* | (2006.01) |
| *D21H 19/22* | (2006.01) |
| *D21J 1/08* | (2006.01) |
| *C08F 220/18* | (2006.01) |

(52) U.S. Cl.
CPC ......... *C08F 212/08* (2013.01); *C08F 212/10* (2013.01); *C08F 220/14* (2013.01); *C08F 220/34* (2013.01); *C08F 220/44* (2013.01); *C08F 220/46* (2013.01); *C08F 226/06* (2013.01); *C09D 5/02* (2013.01); *C09D 125/08* (2013.01); *C09D 125/12* (2013.01); *C09D 125/14* (2013.01); *C09D 133/10* (2013.01); *C09D 133/20* (2013.01); *D21H 17/35* (2013.01); *D21H 17/375* (2013.01); *D21H 17/455* (2013.01); *D21H 19/22* (2013.01); *D21J 1/08* (2013.01); *C08F 220/1804* (2020.02); *C08F 2800/20* (2013.01)

(56) References Cited

U.S. PATENT DOCUMENTS

| | | | | |
|---|---|---|---|---|
| 7,579,414 | B2 * | 8/2009 | Kukula | C08F 212/08 526/328 |
| 8,822,592 | B2 * | 9/2014 | Kok | B01F 17/005 524/556 |
| 9,023,116 | B2 * | 5/2015 | Zacharias | C08F 220/06 8/558 |
| 9,315,660 | B2 * | 4/2016 | Balk | C08F 291/00 |
| 9,481,785 | B2 * | 11/2016 | Song | C08F 2/28 |
| 2002/0040088 | A1 * | 4/2002 | Hauschel | C08F 257/02 524/460 |
| 2008/0039598 | A1 * | 2/2008 | Kukula | C08F 212/08 526/65 |
| 2010/0022701 | A1 * | 1/2010 | Brockmeyer | C08F 2/10 524/533 |
| 2011/0189487 | A1 * | 8/2011 | Zacharias | C08F 220/06 428/413 |
| 2012/0083563 | A1 * | 4/2012 | Song | C08F 2/28 524/460 |
| 2012/0180970 | A1 * | 7/2012 | Song | C08F 212/08 162/164.7 |
| 2013/0245168 | A1 * | 9/2013 | Song | C08F 2/28 524/111 |
| 2017/0369604 | A1 * | 12/2017 | Cimpeanu | D21H 17/37 |
| 2018/0355558 | A1 * | 12/2018 | Cimpeanu | D21H 19/22 |

FOREIGN PATENT DOCUMENTS

| | | |
|---|---|---|
| CN | 102140768 A | 8/2011 |
| CN | 103103878 A | 5/2013 |
| EP | 0051144 A1 | 5/1982 |
| GB | 1421597 | 1/1976 |
| JP | 2009-242686 | 10/2009 |
| WO | WO 2010/139683 A1 | 12/2010 |
| WO | WO 2012/132044 A1 | 10/2012 |
| WO | WO 2016/098006 A1 | 6/2016 |

OTHER PUBLICATIONS

International Search Report dated Feb. 24, 2017, in PCT/EP2016/079365, filed Dec. 1, 2016.

* cited by examiner

FINELY DIVIDED, CATIONIC, AQUEOUS POLYMER DISPERSIONS, METHOD FOR THE PRODUCTION THEREOF, AND THE USE THEREOF

The invention relates to finely divided, cationic, aqueous polymer dispersions which are obtainable by polymerisation of ethylenically unsaturated monomers in a continuous phase containing an aqueous liquid. The invention also relates to a process for the preparation of the polymer dispersions and their use as sizing agents for paper, board and cardboard.

U.S. Pat. No. 3,174,874 describes the surface sizing of paper by employing an aqueous dispersion of a cation active copolymer of 15 to 50% by weight based on the total weight of the copolymer of a heterocyclic compound bearing a single quaternary nitrogen atom in the nucleus in which the heterocyclic compound is selected from N- and C-vinyl substituted derivatives of imidazole, pyridine and quinoline, and 85 to 50% by weight based on the total weight of the copolymer, of difficulty water soluble ethylenically unsaturated monomers.

GB 1421597 refers to a process for the superficial sizing of paper involving the application of an aqueous solution of a water soluble copolymer of from 50 to 90% by weight of one or more alpha olefins of 2 to 12 carbon atoms and from 10 to 40% by weight of one or more mono-olefinically unsaturated monomers containing one or more tertiary or quaternary nitrogen atoms and from 0 to 20% by weight of one or more other olefinically unsaturated monomers. The copolymer has a K value of from 20 to 45.

US 2012/083563 relates to finely divided, cationic, aqueous polymer dispersions which are obtainable by a two-stage polymerisation. Firstly a cationic prepolymer is prepared as a dispersant and thereafter and emulsion polymerisation is carried out in an aqueous solution of this prepolymer in the presence of ethylenically unsaturated monomers. The polymer dispersions are used as sizes for paper, board and cardboard.

Chinese published patent application 103103878 describes a cationic surface sizing agent modified *Sesbania* gum and its method of preparation.

Chinese published patent application 102086614 teaches a surface sizing agent prepared employing silicones, cationic monomer, acrylate monomer, cross-linking monomer, and styrene.

Chinese published patent application 101871184 relates to a cationic styrene acrylate surface sizing agent. The preparation method employs styrene, methyl methacrylate, octadecyl acrylate, allyl alcohol and methacryloyl oxy ethyl trimethyl ammonium chloride in an emulsion polymerisation.

WO 12/132044 reveals a method for producing a cationic surface sizing agent involving a first step for obtaining a copolymer by solution polymerisation of a monomer mixture containing a monomer that has a tertiary amino group, a (meth) acrylic acid ester, and a styrene. In a second step the copolymer obtained in the first step and a non-ionic hydrophilic monomer is polymerised in a second step to obtain a further copolymer. In a third step this further copolymer is polymerised with a hydrophobic monomer in the presence of a surfactant. Finally in a fourth step the tertiary amino group present in the copolymer is quaternised.

Japanese published patent application 2009 242686 provides a cationic surface sizing agent prepared by polymerising a hydrophobic monomer in the presence of a copolymer of a tertiary amino group containing monomer, a (meth) acrylate ester type monomer and a styrene type monomer. The tertiary amino group in the copolymer is converted into a quaternary ammonium salt.

Chinese published patent application 102140768 teaches a cationic surface sizing proposition which is prepared by including a natural macromolecule, a natural high molecule modifier, a hard monomer, a soft monomer, and a cationic monomer. Polymerisation is carried out with the aid of initiating agents and molecular control agents.

International published application No WO 2016/098006, unpublished at the date of filing of the present application, teaches finely divided, cationic, aqueous polymer dispersions which can be made by a single step emulsion polymerisation process employing from 5 and 20% by weight of at least one ethylenically unsaturated monomer comprising a cationic group; up to 60% by weight of at least one optionally substituted styrene; up to 80% by weight of at least one $C_1$-$C_{12}$-alkyl acrylate and/or at least one $C_1$-$C_{12}$-alkyl methacrylate; up to 10% by weight of at least one ethylenically unsaturated monomer comprising at least one acid group; and up to 50% by weight of at least one non-ionic ethylenically unsaturated monomer differing from any of the aforementioned non-ionic monomers. The polymer dispersions are useful as sizing agents for paper, board and cardboard.

There is however a continuous need in the paper industry for novel, effective internal sizes and surface sizes for the production of paper, board and cardboard.

It was therefore an object of the present invention to provide further polymer dispersions which are effective as paper sizes. It would be desirable to provide such polymer dispersions which are cationic Cationic polymeric sizing agents are well known for providing paper, board and cardboard with good hydrophobicity. Typically, cationic surface sizes will often consist of a) a protective colloid which forms the outer hydrophilic shell or hydrophilic outer layer of each particle and b) a hydrophobic core. Often such cationic polymeric sizing agents are made in a two-step process in which a first protective colloid is prepared solution polymerisation followed by an aqueous emulsion polymerisation of hydrophobic monomers in the presence of the protective colloid. A further objective of the present invention is to provide such polymer dispersions which carry a permanent cationic charge.

Often the cationic component of such polymeric sizing agents are formed from amine monomers, such as dialkyl amino alkyl (meth) acrylates, dialkyl amino alkyl (meth) acrylamides. Such amine groups would be rendered cationic by maintaining an acidic pH such that the amine is protonated. However, such protonated amine polymers will lose their cationic charge in less acidic pH environments. This is disadvantageous because the sizing agent would then be no longer as efficient at sizing the surface of paper, board or cardboard.

Quaternary ammonium groups provide a more permanent cationic charge which would not be lost as the pH is raised. Nevertheless, it is generally more difficult to prepare copolymers of quaternary ammonium monomers with hydrophobic monomers and still produce polymer dispersions that are capable of achieving comparable sizing properties as polymer dispersions formed from tertiary amine or other free amine containing monomers.

In a still further objective of the present invention, it would be desirable to provide polymer dispersions carrying a permanent cationic charge, which dispersions are stable in an environment of pH 7 at ambient temperatures.

According to the present invention we provide a finely divided, cationic, aqueous polymer dispersion which is obtainable by emulsion polymerisation of ethylenically unsaturated monomers in an aqueous liquid containing a cationic prepolymer as a dispersant, wherein the cationic prepolymer is prepared in the presence of at least one polymerisation initiator by polymerisation of
(a) from 15 to 45% by weight of at least one ethylenically unsaturated monomer comprising at least one quaternary ammonium group;
(b) from 5 to 80% by weight of at least one optionally substituted styrene;
(c) from 0 to 50% by weight of at least one 01-12 alkyl (meth) acrylate;
(d) from 0 to 10% by weight of at least one ethylenically unsaturated monomer comprising an acid group;
(e) from 0 to 10% by weight of at least one ethylenically unsaturated monomer comprising an amine group; and
(f) from 0 to 20% by weight of at least one non-ionic ethylenically unsaturated monomer differing from (b), (c) and (e),
the sum of (a)+(b)+(c)+(d)+(e)+(f) being 100% by weight, in a first emulsion polymerisation in the presence of at least one non-ionic emulsifier, and thereafter, in the aqueous liquid containing the cationic prepolymer, a second emulsion polymerisation is carried out, in the presence of at least one polymerisation initiator, of a monomer mixture comprising
(i) from 10 to 70% by weight of at least one of an optionally substituted styrene or (meth) acrylonitrile;
(ii) from 30 to 90% by weight of at least one 01-18 alkyl (meth) acrylate;
(iii) from 0 to 30% by weight of at least one vinyl ester of linear or branched $C_{1-30}$ carboxylic acids; and
(iv) from 0 to 30% by weight of at least one non-ionic ethylenically unsaturated monomer differing from (i), (ii) and (iii),
the sum of (i)+(ii)+(iii)+(iv) being 100% by weight,
and the first emulsion polymerisation and/or the second emulsion polymerisation is optionally carried out in the presence of from 0 to 10% by weight of at least one polymerisation regulator.

The molar amount of the quaternary ammonium group containing monomers (a) incorporated into the prepolymer usually should be higher than the molar amount of the anionic monomers (d), so that the prepolymer has a predominantly cationic charge.

The cationic prepolymer is obtainable by the polymerisation of the aforementioned monomer mixtures (a), (b), optionally (c), optionally (d), optionally (e), and optionally (f) in the presence of at least one polymerisation initiator in a first emulsion polymerisation in the presence of at least one non-ionic emulsifier.

The prepolymer which is prepared in the first emulsion polymerisation stage comprises, as component (a), at least one ethylenically unsaturated monomer comprising at least one quaternary ammonium group.

Monomers of group (a) include, for instance, acrylamide-derived cationic monomer (Formula I) or acrylate-derived cationic monomer (Formula II) containing a hydrophobic chain and with the general formula:

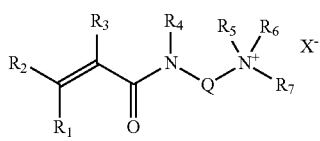
(I)

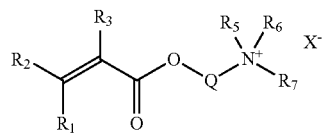
(II)

Where:
R1, R2, R3, R4, R5, R6, independently, can be a hydrogen or an alkyl chain containing 1 to 4 carbons Q: an alkyl chain containing 1 to 8 carbons R7: an alkyl or alkenyl or arylalkyl chain containing 6 to 30 carbons X: a suitable anion, including methosulphate, phosphate or a halide selected from the group including chloride, bromide, iodide, fluoride or another counterion with a negative charge.

A preferred structure for formula (I) is when R1=R2=R3=R4=H, which generates an acrylamide moiety. Another preferred structure is obtained when R1=R2=R4 and R3=CH3. Then a methacrylamide derivative is generated.

Similar to formula (I), a preferred structure for formula (II) is when R1=R2=R3=H, which generates an acrylate moiety. Another preferred structure is obtained when R1=R2=H and R3=CH3. Then a methacrylate derivative is generated.

Among all alkyl possibilities for Q, preferably Q is either an ethyl or a propyl group Preferably, R5=R6 and are either methyl or ethyl moieties For the substitute R7, preferred structures are hexyl, octyl, decyl, dodecyl, hexadecyl, octadecyl or benzyl.

Examples of preferred structures for the invention having the formula (I) are N-acrylamidopropyl-N,N,dimethyl-N-dodecyl ammonium chloride, N-methacrylamidopropyl N,N,dimethyl-N-dodecyl ammonium chloride, N-acrylamidopropyl-N,N,dimethyl-N-dodecyl ammonium bromide, N-methacrylamidopropyl-N,N,dimethyl-N-dodecyl ammonium bromide, N-acrylamidopropyl-N,N,dimethyl-N-octadecyl ammonium chloride, N-methacrylamidopropyl N,N,dimethyl-N-octadecyl ammonium chloride, N-acrylamidopropyl-N,N,dimethyl-N-octadecyl ammonium bromide, N-methacrylamidopropyl-N,N,dimethyl-N-octadecyl ammonium bromide, N-acrylamidopropyl-N,N,dimethyl-N-benzyl ammonium chloride, N-methacrylamidopropyl N,N,dimethyl-N-benzyl ammonium chloride, N-acrylamidopropyl-N,N,dimethyl-N-benzyl ammonium bromide, N-methacrylamidopropyl-N,N,dimethyl-N-benzyl ammonium bromide.

Examples of preferred structures for the invention having the formula (II) are N,N-dimethylaminoethyl acrylate-N-dodecyl chloride, N,N-dimethylaminoethyl methacrylate-N-dodecyl chloride, N,N-dimethylaminoethyl acrylate-N-dodecyl bromide, N,N-dimethylaminoethyl methacrylate-N-dodecyl bromide, N,N-dimethylaminoethyl acrylate-N-octadecyl chloride, N,N-dimethylaminoethyl methacrylate-N-octadecyl chloride, N,N-dimethylaminoethyl acrylate-N-octadecyl bromide, N,N-dimethylaminoethyl methacrylate-N-octadecyl bromide, N,N-dimethylaminoethyl acrylate-N-benzyl chloride, N,N-dimethylaminoethyl methacrylate-N-benzyl chloride, N,N-dimethylaminoethyl acrylate-N-benzyl bromide, N,N-dimethylaminoethyl methacrylate-N-benzyl bromide Suitable monomers of group (a) include ethylenically unsaturated esters or amides which carry a quaternary ammonium group. Typically such esters may have the formula (III)

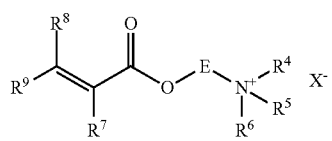

(III)

wherein $R^7$, $R^8$ and $R^9$ are the same or different and are hydrogen or methyl, E is $C_{2-3}$-alkylene, $R^4$, $R^5$ and $R^6$ are the same or different and are $C_{1-3}$-alkyl and X is a suitable anion, including methosulphate, halide or phosphate.

Examples of ethylenically unsaturated amides which carry a quaternary ammonium group may have the formula (IV)

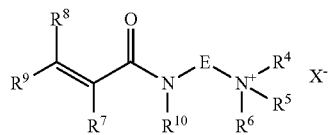

(IV)

wherein $R^7$, $R^8$, $R^9$, E, $R^4$, $R^5$, $R^6$ and X have the meaning as indicated above, $R^{10}$ is hydrogen or methyl.

Examples of $C_{2-3}$-alkylene are ethylene, trimethylene and propylene. Examples of $C_{1-3}$-alkyl are methyl, ethyl, propyl and isopropyl.

Preferred monomers include acryloyloxy ethyl trimethyl ammonium salts, including the chloride salt, and methacryloyl oxy ethyl trimethyl ammonium salts, including the chloride salt. Particularly preferred are acryloyloxy ethyl trimethyl ammonium salts, particularly the chloride salt.

Another suitable category of ethylenically unsaturated monomers bearing cationic groups include diallyl ammonium compounds. Typically such compounds may have formula (V)

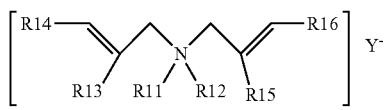

(V)

wherein $R_{11}$ and $R_{12}$ independently are hydrogen or $C_1$-$C_4$ alkyl, hydroxyl $C_1$-$C_4$ alkyl, carboxy $C_1$-$C_4$ alkyl, carboxyamide $C_1$-$C_4$ alkyl, alkoxyalkyl group, wherein the alkoxyalkyl group is defined as having from 1 to 18 carbon atoms in the alkyl group;

$R_{13}$ and $R_{15}$ independently are hydrogen, methyl, ethyl or halogen;

$R_{14}$ and $R_{16}$ independently are hydrogen, $C_1$-$C_6$ alkyl, or halogen; and Y⁻ is an anion.

Y⁻ is preferably a halide.

The diallyldialkyl ammonium salt is preferably a halide salt and the diallyldialkyl ammonium is a monomer of formula (V). Most preferably the diallydialkyl ammonium salt is diallyl dimethyl ammonium chloride (DADMAC).

A further category of suitable monomers of group (a) include cationic heterocyclic compounds which are substituted by an ethylenically unsaturated moiety. Particularly suitable compounds include N- or C-vinyl substituted heterocyclic compounds which contain only nitrogen atoms as hetero atoms in the nucleus, especially N-vinyl substituted derivatives of imidazole and C-vinyl substituted derivatives of pyridine of the general formula (VI) and general formula (VII):

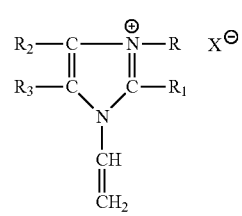

(VI)

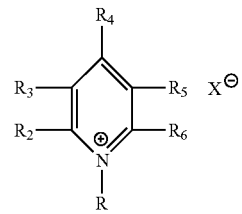

(VII)

Wherein $X^\ominus$ is an anion, especially halide or alkyl sulphate radical, preferably one of the anions chloride, bromide, iodide, methyl sulphate, ethyl sulphate and propyl sulphate. R is an alkyl, cyclo alkyl or aralkyl radical, preferably methyl, ethyl, propyl, cyclohexyl or benzyl group, $R_1$ to $R_6$ is hydrogen and/or alkyl radicals with 1 to 3 carbon atoms, such as methyl, ethyl, propyl and/or isopropyl groups and additionally one of the substituents $R_4$ to $R_5$ must be a vinyl group. The substituents $R_2$ and $R_3$ together may also be the radical —CH=CH—CH=CH—.

Suitable compounds include 1-methyl-2-vinyl pyridinium bromide and methosulphate, 1,2-dimethyl-5-vinyl-pyridinium methosulphate, 1-ethyl-2-vinyl-pyridinium chloride and bromide, 1-propyl-2-vinyl pyridinium chloride, 2-vinyl pyridinium ethyl sulphate, 1-benzyl-4-vinyl pyridinium chloride, N-vinyl-N'-ethyl imidazolium chloride, N-vinyl-N'-isopropyl-imidazolium chloride, 1-vinyl-3-methyl-benzimidazolium methosulphate, 1-methyl-2-vinyl-quinolinium methosulphate and 1-benzyl-4-vinyl-quinolinium chloride. Preferred of these monomers is N-vinyl-N'-methyl imidazolium salts including the methosulphate salt.

Most preferred monomers of group (a) include firstly acryloyloxy ethyl trimethyl ammonium salts, including the chloride salt, also known as the methylchloride quaternary ammonium salt of dimethyl amino ethyl acrylate, and secondly N-vinyl-N'-methyl imidazolium salts particularly the methosulphate salt, also known as 3-methyl-vinyl-1H-imidazolium methyl sulphate.

It is preferred that when the monomer of group (a) is acryloyloxy ethyl trimethyl ammonium chloride that monomers of group (d) are included. Nevertheless it is preferred that when the monomer of group (a) is N-vinyl-N'-methyl imidazolium salts, such as the methosulphate salt, that the monomers of group (d) are absent. It is also preferred that when the monomer of group (a) is a combination of N-vinyl- N'-methyl imidazolium salts, such as the methosulphate salt, and acryloyloxy ethyl trimethyl ammonium chloride that the monomers of group (d) are absent.

Monomers of group (a) are used in the preparation of the prepolymer in an amount of from 15 to 45% by weight, preferably from 20 to 45% by weight, based on the monomer mixture (a) to (f).

For the preparation of the cationic prepolymer, optionally substituted styrenes, such as styrene, α-methylstyrene, ethylstyrene or vinyltoluene can be employed as monomers of group (b). The monomers of group (b) are present in an amount of from 5 to 80% by weight, preferably from 15 to 75% by weight, and more preferably from 15 to 60% by weight in the monomer mixture comprising (a) to (f).

Where monomers of group (c) are included in the preparation of the cationic prepolymer, suitable monomers of this group (c) are all esters of acrylic acid and of methacrylic acid which are derived from monohydric 01-$C_{12}$-alcohols, such as methyl acrylate, methyl methacrylate, ethyl acrylate, ethyl methacrylate, n-propyl acrylate, n-propyl methacrylate, isopropyl acrylate, isopropyl methacrylate, n-butyl acrylate, n-butyl methacrylate, isobutyl acrylate, isobutyl methacrylate, tert-butyl acrylate, tert-butyl methacrylate, sec-butyl acrylate, sec-butyl methacrylate, n-pentyl acrylate, n-pentyl methacrylate, neopentyl acrylate, neopentyl methacrylate, cyclohexyl acrylate, cyclohexyl methacrylate, 2-hexyl acrylate, 2-hexyl methacrylate, 2-ethylhexyl acrylate, 2-ethylhexyl methacrylate, n-octyl acrylate, n-octyl methacrylate, isooctyl acrylate, isooctyl methacrylate, decyl acrylate and decyl methacrylate, dodecyl acrylate, dodecyl methacrylate, 2-propylheptyl acrylate and 2-propylheptyl methacrylate. Preferably used monomers of this group are esters of acrylic acid and methacrylic acid with 01-$C_8$-alcohols, such as methyl acrylate, methyl methacrylate, ethyl acrylate, n-propyl acrylate, isopropyl acrylate, n-butyl acrylate, sec-butyl acrylate, isobutyl acrylate, tert-butyl acrylate, cyclohexyl acrylate, 2-ethylhexyl acrylate and 2-ethylhexyl methacrylate. The esters of acrylic acid with 01-$C_4$-alcohols, such as n-butyl acrylate, sec-butyl acrylate, isobutyl acrylate and tert-butyl acrylate are very particularly preferred.

According to the invention, at least one 01-$C_{12}$-alkyl acrylate and/or 01-$C_{12}$-alkyl methacrylate is used as a monomer of group (c), for example two or more of the above-mentioned esters in any desired mixtures with one another. Preferably the monomers of group (c) comprises any of the esters of 01-$C_4$-alcohols with acrylic acid or methacrylic acid. Specifically preferred monomers of group (c) include methyl acrylate, methyl methacrylate, n-butyl acrylate, tert-butyl acrylate or mixtures thereof.

The monomers of group (c) are optional in the preparation of the cationic prepolymer but may be present in an amount of up to 50% by weight in the monomer mixture (a) to (f). Where monomers of group (c) are included in the monomer mixture, desirably the monomers are included in an amount of from 5% to 45%, suitably from 10% to 40%, and more suitably from 10% to 35%, by weight in the monomer mixture (a) to (f).

The monomers of group (d) is an optional component of the monomer mixture in the preparation of the cationic prepolymer.

Examples of monomers of group (d) are ethylenically unsaturated $C_3$- to $C_6$-carboxylic acids, such as acrylic acid, methacrylic acid, maleic acid, fumaric acid, itaconic acid, ethacrylic acid, crotonic acid, monoesters of ethylenically unsaturated dicarboxylic acids, such as mono methyl maleate, mono methyl fumarate, mono ethyl maleate, mono ethyl fumarate, mono propyl maleate, mono propyl, fumarate, mono-n-butyl maleate, mono-n-butyl fumarate, and styrene carboxylic acids and ethylenically unsaturated anhydrides, such as maleic anhydride and itaconic anhydride. Depending on the water content of the monomer mixture used in the first emulsion polymerisation, the anhydride group of monomers may be hydrolysed to carboxyl groups. In addition, monomers comprising sulpho- and/or phosphonic acid groups, such as 2-acrylamido-2-methyl propane sulphonic acid and vinyl phosphonic acid, are suitable as monomers (d). The monomers comprising acid groups can be used in the form of free acid groups and in the form of partly or completely neutralised with alkali metal bases, alkaline earth metal bases, ammonia and/or amines. For example, sodium hydroxide solution, potassium hydroxide solution, sodium carbonate, sodium bicarbonate, ammonia, trimethyl amine, triethyl amine, morpholine, ethanolamine, diethanolamine, triethanolamine, or diethylene triamine is used for neutralising the acid groups of the monomers. It is of course possible to use two or more bases as neutralising agents.

From this group of monomers, acrylic acid and methacrylic acid or mixtures of acrylic acid and methacrylic acid in any desired ratio are preferably used. The monomers of group (d) are present in an amount of from 0 to 10% by weight in the reaction mixture comprising (a) to (f). Desirably these monomers may be included in an amount of from 0.5 to 10% by weight, suitably from 1 to 7% by weight, for instance between 1.5 and 6% by weight. In some cases it may be desirable that monomers of component (d) are absent.

It may also be desirable to include monomers of group (e) in a monomer mixture for the preparation of the cationic prepolymer. Suitable monomers may include at least one ethylenically unsaturated monomer comprising an amine group.

Such compounds having an amino group include those of the general formula (VIII):

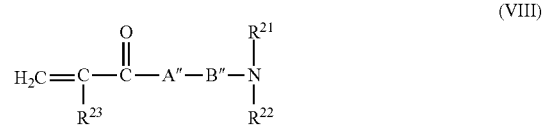

(VIII)

in which
A" is O, NH,
B" is $C_nH_{2n}$, where n is an integer in the range from 1 to 8,
$R_{21}$, $R_{22}$ are $C_mH_{2m+1}$, where m is an integer in the range from 1 to 4, and
$R^{23}$ is H, $CH_3$.

The compounds of the formula (VIII) are designated as a rule as basic monomers. Basic, ethylenically unsaturated monomers are, for example, acrylates and methacrylates of amino alcohols, e.g. N,N-dimethylaminoethyl acrylate, N,N-dimethylaminoethyl methacrylate, N,N-diethylaminoethyl acrylate, N,N-diethylaminoethyl methacrylate, N,N-dimethylaminopropyl acrylate, N,N-dimethylaminopropyl methacrylate, N,N-dibutylaminopropyl acrylate, N,N-dibutylaminopropyl methacrylate, N,N-dimethylaminoneopentyl acrylate, derivatives of acrylamide or of methacrylamide which comprise amino groups, such as N,N-dimethylaminoethylacrylamide, N,N-dimethylaminoethylmethacrylamide, N,N-dimethylaminopropylacrylamide and N,N-dimethylaminopropylmethacrylamide.

The monomers of group (e) may be present in an amount from 0 to 10% by weight of the monomer mixture (a) to (f) in the preparation of the cationic prepolymer. When monomers of this group (e) are included in the monomer mixture they may be included in an amount from of 0.1 to 9%, for instance from 1% to 7%. Preferably monomers of group (e) are absent from the monomer mixture used in the preparation of the cationic prepolymer.

Monomers of group (f) comprise one or more non-ionic, ethylenically unsaturated monomers which are different from the monomers (b), (c) and (e). Examples of such monomers are amides, such as, for example, acrylamide, methacrylamide, N-methyl acrylamide, N-methyl methacrylamide, N-ethyl acrylamide and N-ethyl methacrylamide; vinyl compounds, such as vinyl acetate, vinyl propionate or vinylformamide; 013-30 alkyl (meth) acrylates. The alkyl moiety of the ester may for instance contain between 13 and 24 carbon atoms. Suitable compounds include tridecyl acrylate, tridecyl methacrylate, tetradecyl acrylate, tetradecyl methacrylate, pentadecyl acrylate, pentadecyl methacrylate, hexadecyl acrylate, hexadecyl methacrylate, heptadecyl acrylate, heptadecyl methacrylate, octadecyl acrylate, such as n-octadecyl acrylate (stearyl acrylate), octadecyl methacrylate, such as n-octadecyl acrylate (stearyl acrylate), nonadecyl acrylate, nonadecyl methacrylate, cosyl acrylate, cosyl methacrylate, eicosyl acrylate, eicosyl methacrylate, docosyl acrylate, docosyl methacrylate, tricosyl acrylate, tricosyl methacrylate, tetracosyl acrylate, tetracosyl methacrylate or mixtures thereof. Alternatively the esters of acrylic acid or methacrylic acid having been prepared by reacting at least one ethylene oxide unit, for example hydroxyl ethyl methacrylate or diethylene glycol monomethacrylate. Other suitable monomers of this group include acrylonitrile and methacrylonitrile. It is of course also possible to use mixtures of said monomers.

If the monomers group (f) are used, they are present in an amount of up to 20% by weight, and normally no more than 10%, for instance in an amount of up to 5% by weight, based on the total amount of monomers (a) to (f) in the monomer mixture in the preparation of the cationic prepolymer. Suitably these monomers may be included in an amount of from 0.5 to 5% by weight, for instance from 0.7 to 3.5% by weight, in the monomer mixture comprising monomers (a) to (f) in the monomer mixture. Preferably, monomers of group (f) are absent.

The sum of the amounts in % by weight for the monomers (a) to (f) is always 100.

Preferred finely divided, cationic, aqueous polymer dispersions are those wherein the cationic prepolymer is obtainable by polymerisation of
(a) from 20 to 45% by weight of at least one ethylenically unsaturated monomer comprising at least one quaternary ammonium group;
(b) from 15 to 75% by weight of styrene;
(c) from 0 to 50% by weight of at least one 01-12 alkyl (meth) acrylate;
(d) from 0 to 10% by weight of acrylic acid and/or methacrylic acid; and
(e) from 0 to 10% by weight of at least one of N,N-dimethylaminopropylmethacrylamide, N,N-dimethylaminoethyl methacrylate and N,N-dimethylaminoethyl acrylate.

More preferred finely divided, cationic, aqueous polymer dispersions are those in which the cationic prepolymer is obtainable by polymerisation of
(a) from 20 to 45% by weight of at least one ethylenically unsaturated monomer comprising at least one quaternary ammonium group, selected from the group consisting of a quaternary ammonium salt of dialkyl amino alkyl acrylate, a quaternary ammonium salt of dialkyl amino alkyl methacrylate, a diallyl dimethyl ammonium salt and a quaternary ammonium salt of vinyl imidazole;
(b) from 15 to 60% by weight of styrene;
(c) from 0 to 50% by weight of at least one 01-$C_4$-alkyl acrylate and/or at least one $C_1$-$C_4$-alkyl methacrylate; and
(d) from 0 to 10% by weight of acrylic acid and/or methacrylic acid.

In the first polymerisation stage, the monomers (a) to (f) are polymerised by aqueous emulsion polymerisation in the presence of at least one non-ionic emulsifier and at least one polymerisation initiator.

Desirably the reaction mixture is stirred or subjected to a mixing during the whole of the first polymerisation stage.

Preferably the first polymerisation stage can be carried out by providing an initial mixture containing the at least one monomer of group (a), water and at least one non-ionic emulsifier followed by feeding the monomers of groups (b), (c), optionally (d), optionally (e), and optionally (f) into the initial mixture. The monomers of groups (b), (c), optionally (d), optionally (e), and optionally (f) may be fed into the initial mixture separately or as one or more mixtures of the monomers of groups (b), (c), optionally (d), optionally (e), and optionally (f). Preferably the monomers of groups (b), (c), optionally (d), optionally (e), and optionally (f) are combined into a single monomer mixture and fed into the initial mixture, containing the at least one monomer of group (a).

The monomers (b), (c), optionally (d), optionally (e), and optionally (f) are preferably introduced into the initial mixture over a period of time. Suitably this may be over a period of time ranging from 10 min to 6 hours, for instance from 10 min to 4 hours, typically from 20 min to 2 hours, and often from 30 min to 1 hour.

The feeding of the monomers for carrying out the first emulsion polymerization can be effected continuously or batchwise. With the use of a monomer mixture, the feeding of the monomers can be effected as a mixture or separately or in the manner of a step or gradient procedure. The addition can be effected uniformly or nonuniformly, i.e. with a changing feeding rate, over the feeding period. This may for instance include adding the mixture of monomers of groups (b), (c), optionally (d), optionally (e), and optionally (f) in any of these ways to the initial mixture containing at least one monomer of group (a).

The non-ionic emulsifier, present in the monomer mixture, is necessary for inducing a dispersing effect necessary for the first polymerisation stage to be an emulsion polymerisation. Customary non-ionic emulsifier is may be employed for this purpose. The amounts used are from 0.1 to 10% by weight, based on the weight of the monomers (a) to (f). Preferably the amount of monomers are in the range of from 0.2% to 9% by weight, more preferably 0.5% to 8% by weight, still more preferably 1% to 7% by weight, based on the weight of monomers (a) to (f).

For enhancing the dispersing effect, customary ionic, nonionic or amphoteric emulsifiers may be added to the polymerization batch. Customary emulsifiers are only optionally used. The amounts used are from 0 to 3% by weight and are preferably in the range from 0.02 to 2% by weight, based on the sum of the monomers (a), (b) and (c) used.

Customary non-ionic emulsifiers are described in detail in the literature, cf. for example M. Ash, I. Ash, Handbook of Industrial Surfactants, third edition, Synapse Information Resources Inc. Examples of customary emulsifiers are the reaction products of long-chain monohydric alcohols ($C_{10}$- to $C_{22}$-alkanols) with 4 to 50 mol of ethylene oxide and/or propylene oxide per mole of alcohol or ethoxylated phenols.

Preferred emulsifiers may be the emulsifiers used in accordance with the present invention comprise compounds having the formula

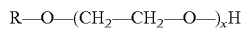

$$R\text{—}O\text{—}(CH_2\text{—}CH_2\text{—}O\text{—})_xH$$

in which R is an alkyl group of at least 12 carbon atoms, preferably a linear, saturated alkyl group of 16 to 18 carbon atoms, and x is at least 12, and preferably 18 and 80. More preferred emulsifiers include Lutensol® AT 18, Lutensol® AT 25, Lutensol® AT 50 and Lutensol® AT 80 all which are available from BASF SE.

In some cases it may be desirable to employ an emulsifier which comprises a polymerisable compound. Such a polymerisable compound may have the formula

$$R'(\text{—}O\text{—}CH_2\text{—}CH_2)_xM$$

in which R' is an alkyl group of at least one carbon atom, preferably between 1 and 22 carbon atoms, and M is a polymerisable moiety containing an ethylenically unsaturated group, preferably selected from acryloyloxy, methacryloyloxy, acrylamido, methacrylamido, and allyl ether.

Suitable polymerisable emulsifiers include Plex® 6954-O, which is a methacrylic ester of an ethoxylated 016-$C_{18}$ fatty alcohol, available from Evonik; and Bisomer® MPEG 350 MA, which is a methoxy polyethylene glycol 350 methacrylate, available from GEO Specialty Chemicals.

In the preferred form of the invention the non-ionic emulsifier is included in the initial mixture. Alternatively, a portion of the non-ionic emulsifier may be included with the monomer (a), and water to form an initial mixture and the remainder of the non-ionic emulsifier may be included with the mixture of monomers (b) to (f).

It may be desirable to include a further emulsifier into the first emulsion polymerisation stage additional to the aforementioned non-ionic emulsifier. Generally this further emulsifier should be either a non-ionic emulsifier or an anionic emulsifier. When the further emulsifier is a non-ionic emulsifier it may be any of the non-ionic emulsifiers referred to in this specification. When the further emulsifier is an anionic emulsifier, it may be any of the customary anionic emulsifier is described in detail in the literature, cf. for example M. Ash, I. Ash, Handbook of Industrial Surfactants, third edition, Synapse Information Resources Inc. Examples of suitable anionic emulsifiers glue sodium alkanesulfonates, sodium alkylsulfates, sodium dodecylbenzenesulfonate and sulfosuccinic esters. The further emulsifier may also be included in the initial mixture containing monomer (a). However, it is preferred that the further emulsifier be introduced concomitantly during the introduction of the mixture of monomers (b) to (f). More preferably, the further emulsifier should be included in the mixture of monomers (b) to (f), which mixture is introduced into the initial mixture.

The amount of further emulsifier included into the first emulsion polymerisation stage may be from 0.05% to 3% by weight, based on the weight of monomers (a) to (f), preferably from 0.1% to 1% by weight.

It may also be desirable to include one or more acids into the monomer mixture of the first emulsion polymerisation stage. Preferably the one or more acids should be included in the initial mixture comprising monomer (a), water and non-ionic emulsifier. Preferably the one or more acids are organic acids, especially carboxylic acids. Particularly preferred acids are acetic acid and formic acid. The amounts of acid where included may be for instance up to 40% by weight, based on the weight of the monomers (a) to (f), preferably from 10% to 35% by weight.

The first emulsion polymerisation stage requires the presence of at least one polymerisation initiator. Any suitable free radical initiator or initiators may be used for initiating the polymerisation. Preferably, a redox initiator system should be used to effect polymerisation. Said redox initiators are preferably graft-linking, water-soluble redox systems, for example comprising hydrogen peroxide and a heavy metal salt or comprising hydrogen peroxide and sulfur dioxide or comprising hydrogen peroxide and sodium metabisulfite. Further suitable redox systems are combinations of tert-butyl hydroperoxide/sulfur dioxide, sodium or potassium persulfate/sodium bisulfite, ammonium persulfate/sodium bisulfite or ammonium persulfate/iron(II) sulfate. Preferably, hydrogen peroxide is used in combination with a heavy metal salt, such as iron(II) sulfate. Frequently, the redox system additionally comprises a further reducing agent, such ascorbic acid, sodium formaldehyde sulfoxylate, sodium disulfite or sodium dithionite. The redox initiators are used, for example, in an amount of from 0.05 to 10% by weight, preferably from 0.1 to 5% by weight, based on the monomers (a) to (f).

It is usually desirable to introduce at least one polymerisation initiator into the initial mixture containing monomer (a), water and the non-ionic emulsifier and then introduce at least one further polymerisation initiator during the introduction of the monomers of groups (b) to (f).

When the at least one polymerisation initiator is a redox initiator system, comprising two polymerisation initiators as a redox couple, it is preferred to introduce one component of the redox couple into the aforementioned initial mixture and the other component of the redox couple into the mixture of monomers (b) to (f). More preferably, the reducing agent component of the redox couple would be introduced into the initial mixture and the oxidising agent component of the redox couple would be introduced into the mixture of monomers (b) to (f).

In may be desirable to start the first emulsion polymerisation by raising the temperature of the monomer mixture or at least one component of the monomer mixture. Desirably, the temperature should be raised to at least 60° C., for instance from 60° C. to 100° C., preferably from 70° C. to 95° C., more preferably from 75° C. to 90° C. Preferably, the temperature of the initial mixture comprising monomer (a), water and non-ionic emulsifier should be raised. Preferably the temperature during the first emulsion polymerisation stage should be maintained at the elevated temperature, for instance at a temperature within any of the aforementioned ranges. The temperature during the first emulsion polymerisation stage may be fluctuated within the aforementioned ranges or preferably maintained at substantially a constant temperature.

After all of the monomer mixture (a) to (f) and after all of the polymerisation initiators have been introduced into the first emulsion polymerisation stage it may be desirable to employ a post polymerisation step. This can, for instance, be achieved by continuing to stir or mix the reaction mixture for a period of time. This may be up to 2 hours, but generally will be from 5 min to 90 min, preferably from 10 min to 60 min, and usually from 20 min to 50 min. Usually, a post polymerisation step would be carried out by maintaining an elevated temperature, which would normally correspond to the temperature or range of temperatures employed in the main part of the polymerisation process. Typically, the temperature of the main part of the polymerisation process would be maintained during the post polymerisation step.

The pH of the reaction mixture is, for example, in the range from 1 to 6, in general from 2 to 5, in the first emulsion polymerization stage.

The cationic prepolymers prepared in the first emulsion polymerisation stage have a relatively low molar mass, for example Mw of from 500 to 100,000, preferably from 2000 to 50,000 (determined by light scattering). The determination of the molecular weight distribution and of the mass average molecular weight can be carried out by methods known to the person skilled in the art, such as, for example, gel permeation chromatography, light scattering or ultracentrifuging.

The product of the first emulsion polymerisation is an aqueous cationic prepolymer composition comprising the cationic prepolymer dispersed in an aqueous medium. The concentration of the cationic prepolymer prepared in the first emulsion polymerization stage is, for example, from 5 to 60, preferably from 10 to 50, for instance from 10 to 35, or from 10 to 30% by weight. The aqueous cationic prepolymer composition may then be used in the second stage of the polymerization as an initially taken mixture or emulsifier/protective colloid and possibly as a seed for the second emulsion polymerization.

The second emulsion polymerisation stage is desirably conducted by introducing the components of the second emulsion polymerisation into the aqueous cationic prepolymer composition.

In the second emulsion polymerisation stage the monomer mixture comprising
(i) from 10 to 70% by weight of at least one of an optionally substituted styrene or (meth) acrylonitrile;
(ii) from 30 to 90% by weight of at least one 01-18 alkyl (meth) acrylate;
(iii) from 0 to 30% by weight of at least one vinyl ester of linear or branched $C_{1-30}$ carboxylic acids; and
(iv) from 0 to 30% by weight of at least one non-ionic ethylenically unsaturated monomer differing from (i), (ii) and (iii),
the sum of (i)+(ii)+(iii)+(iv) being 100% by weight,
is polymerised.

The monomers of group (i) are at least one of an optionally substituted styrene, acrylonitrile or methacrylonitrile. Optionally substituted styrenes are for example styrene, α-methylstyrene, ethylstyrene or vinyltoluene. The preferred monomer of group (i) is styrene. Preferably the amount of monomers of this group, for instance styrene, should be from 10% to 60% by weight, based on the monomer mixture (i) to (iv).

The monomers of group (ii) include (meth)acrylates of $C_1$- to $C_{18}$-alcohols. Monomers (ii) are, for example, methyl acrylate, ethyl acrylate, n-propyl acrylate, isopropyl acrylate, n-butyl acrylate, sec-butyl acrylate, isobutyl acrylate, tert-butyl acrylate, ethylhexyl acrylate, n-octyl acrylate, cyclohexyl acrylate, decyl acrylate, dodecyl acrylate, tetradecyl acrylate, methyl methacrylate, ethyl methacrylate, n-propyl methacrylate, isopropyl methacrylate, n-butyl methacrylate, sec-butyl methacrylate, isobutyl methacrylate, tert-butyl methacrylate, ethylhexyl methacrylate, n-octyl methacrylate, cyclohexyl methacrylate, decyl methacrylate, dodecyl methacrylate and tetradecyl methacrylate. From this group of monomers, n-butyl acrylate and tert-butyl acrylate are preferably used, in each case alone or in any desired mixtures.

Monomers of group (iii) are vinyl esters of linear or branched $C_1$-$C_{30}$-carboxylic acids. Such carboxylic acids are saturated and straight-chain, such as formic acid, acetic acid, propionic acid, butyric acid, valeric acid, caproic acid (hexanoic acid), heptanoic acid, caprylic acid (octanoic acid), pelargonic acid, capric acid (decanoic acid), undecanoic acid, lauric acid (dodecanoic acid), tridecanoic acid, myristic acid (tetradecanoic acid), pentadecanoic acid, palmitic acid, margaric acid, stearic acid, nonadecanoic acid, arachidic acid, behenic acid, lignoceric acid (tetracosanoic acid), cerotinic acid, melissic acid (triacontanoic acid). According to the invention, saturated, branched carboxylic acids, such as, for example, isobutyric acid, isovaleric acid (3-me-thylbutyric acid) and tubercolostearic acid, and strongly branched saturated carboxylic acid are also suitable. The latter are known by the term versatic acids, such as, for example, pivalic acid, neohexanoic acid, neoheptanoic acid, neooctanoic acid, neononanoic acid and neodecanoic acid. Suitable vinyl esters of linear or branched $C_1$-$C_{30}$-carboxylic acids are, for example, vinyl laurate, vinyl stearate, vinyl propionate, vinyl versatate, vinyl acetate, vinyl propylheptanoate, vinyl neodecanoate (VeoVa® 10 from Hexion Specialty Chemicals), vinyl neononanoate (VeoVa® 9 from Hexion Specialty Chemicals) and vinyl pelargonate. Preferably, the monomers of group (iii) should be absent from the monomer mixture of the second emulsion polymerisation.

Examples of suitable monomers of group (iv) are acrylamide, methacrylamide, Nmethylolacrylamide, N-methylolmethacrylamide, N—$C_1$- to $C_{18}$-alkylacrylamides, N—$C_1$- to $C_{18}$-alkylmethacrylamides, N-vinylamides, N-vinylpyrrolidone, N-vinylimidazole, $C_1$- to $C_{18}$-alkyl vinyl ethers, hydroxyalkyl esters and esters of monoethylenically unsaturated mono- and dicarboxylic acids with $C_2$-$C_4$-polyalkylene glycols.

The monomers of group (iv) furthermore include the monoethylenically unsaturated monomers which have already been mentioned under (a) and have at least one amino group protonatable in an aqueous medium and/or a quaternary ammonium group.

In addition, crosslinking monomers can also be used as monomers (iv). Examples of such crosslinking agents are butanediol diacrylate, butanediol dimethacrylate, hexanediol diacrylate, hexanediol dimethacrylate, glycol diacrylate, glycol dimethacrylate, trimethylolpropane triacrylate, trimethylolpropane trimethacrylate, pentaerythrityl triacrylate, pentaerythrityl tetraacrylate, diacrylates and dimethacrylates of alkoxylated dihydric alcohols, divinylurea and/or conjugated diolefins, such as butadiene or isoprene.

Depending on the intended use, the monomers of group (iv) may also comprise so-called functional monomers, i.e. monomers which, in addition to a polymerizable C═C double bond, also have a reactive functional group, for example an oxirane group, a reactive carbonyl group, e.g. an acetoacetyl group, an isocyanate group, an N-hydroxymethyl group, an N-alkoxymethyl group, a trialkylsilyl group, a trialkoxysilyl group or another group reactive toward nucleophiles.

Preferably the monomers of group (iv) should be absent from the monomer mixture of the second emulsion polymerisation.

A monomer mixture comprising
(i) from 10 to 60% by weight of styrene;
(ii) from 30 to 90% by weight of n-butyl acrylate, tert-butyl acrylate or mixtures of n-butyl acrylate and tert-butyl acrylate
is preferred.

It is generally preferred to subject the reaction mixture to stirring or mixing during the second emulsion polymerisation stage.

In the second emulsion polymerisation stage the monomers of groups (i), (ii), where employed (iii), and where employed (iv) should be introduced into the aqueous cationic prepolymer composition. These monomers may be introduced separately or preferably introduced as a mixture. Suitably the monomers may be introduced by feeding a stream of the monomers into the aqueous cationic prepolymer composition over a period of time.

The feeding of the monomers for carrying out the second emulsion polymerization can be effected continuously or batchwise. With the use of a monomer mixture, the feeding of the monomers can be effected as a mixture or separately or in the manner of a step or gradient procedure. The addition can be effected uniformly or nonuniformly, i.e. with a changing feeding rate, over the feeding period. By adding a portion of the monomer to the initially taken mixture comprising aqueous composition of the cationic prepolymer, feeding by means of a swelling procedure is possible.

Desirably the monomers may be fed over a period of several hours but usually would be fed for a period of time, for instance in the range of from 30 min to 3 hours, preferably from 45 min to 2 hours, especially from 45 min to 90 min.

The second emulsion polymerisation stage requires the presence of at least one polymerisation initiator. Any suitable free radical initiator or initiators may be used for initiating the polymerisation. It may be desirable to employ a redox initiator system should be used to effect polymerisation similar to any of the aforementioned redox initiator systems referred to in regard to the first emulsion polymerisation stage. However, in many cases it may be more desirable to employ a single free radical initiator. Preferably, such a free radical initiator is an oxidising agent initiator, for instance, a peroxide, such as hydrogen peroxide, tertiary butyl hydroperoxide, etc.

The at least one polymerisation initiator may be introduced at the start of the second emulsion polymerisation stage but it is usually preferred to introduce the initiator by feeding it into the reaction mixture of the second emulsion polymerisation stage over a period of time. The time over which the at least one polymerisation initiator is fed into the reaction mixture may be similar to the length of time of feeding the monomer mixture (i) to (iv). Preferably the at least one polymerisation initiator feed is commenced at the same time that the monomer feed commences. The initiator feed may be continued for up to several hours, for instance from 30 min to 4 hours, typically from 45 min to 3 hours, often from 60 min to 2.5 hours.

In may be desirable to start the first emulsion polymerisation by maintaining the temperature of first emulsion polymerisation stage throughout the second emulsion polymerisation stage.

Desirably, the temperature should be at least 60° C., for instance from 60° C. to 100° C., preferably from 70° C. to 95° C., more preferably from 75° C. to 90° C. Preferably the temperature during the second emulsion polymerisation stage should be maintained at a temperature within any of the aforementioned ranges. The temperature during the second emulsion polymerisation stage may be fluctuated within the aforementioned ranges or preferably maintained at substantially a constant temperature.

In order to remove the remaining monomers as substantially as possible from the polymer dispersion, a postpolymerization is expediently carried out after the end of the actual polymerization. The post polymerisation typically may be carried out after all of the monomer mixture (i) to (iv) and after all of the polymerisation initiators have been introduced into the second emulsion polymerisation stage. Alternatively it may be desirable to use additional polymerisation initiators. For this purpose, for example, an initiator from the group consisting of hydrogen peroxide, peroxides, hydroperoxides and/or azo initiators is added to the polymer dispersion after the end of the main polymerization. Combining of the initiators with suitable reducing agents, such as, for example, ascorbic acid, Rongalit™ C (Product of BASF SE) (sodium hydroxymethanesulfinate) or sodium bisulfite, is also possible. Oil-soluble, sparingly water-soluble initiators are preferably used, for example customary organic peroxides, such as dibenzoyl peroxide, di-tert-butyl peroxide, tert-butyl hydroperoxide, cumyl hydroperoxide or biscyclohexyl peroxydicarbonate. For the postpolymerization, the reaction mixture is heated, for example, to a temperature which corresponds to the temperature at which the main polymerization was carried out or which is up to 40° C., preferably up to 20° C., lower. The main polymerization is complete when the polymerization initiator has been consumed or the monomer conversion is, for example, at least 98%, preferably at least 99.5%. For the postpolymerization, tert-butyl hydroperoxide is preferably used.

The pH of the reaction mixture is, for example, in the range from 1 to 6, in general from 2 to 5, in the second emulsion polymerization stage.

It may not be necessary to employ any further emulsifiers into the second emulsion polymerisation stage. Often the cationic prepolymer provides sufficient dispersing effect during the second emulsion polymerisation. However, in some cases it may be desirable to employ one or more emulsifiers.

Customary emulsifiers are only optionally used. The amounts used are from 0 to 3% by weight and are preferably in the range from 0.02 to 2% by weight, based on the sum of the monomers (a), (b) and (c) used. Customary emulsifiers are described in detail in the literature, cf. for example M. Ash, I. Ash, Handbook of Industrial Surfactants, third edition, Synapse Information Resources Inc. Examples of customary emulsifiers are the reaction products of long-chain monohydric alcohols ($C_{10}$- to $C_{22}$-alkanols) with 4 to 50 mol of ethylene oxide and/or propylene oxide per mole of alcohol or ethoxylated phenols, or alkoxylated alcohols esterified with sulfuric acid which are generally used in a form neutralized with alkali. Further customary emulsifiers are, for example, sodium alkanesulfonates, sodium alkylsulfates, sodium dodecylbenzenesulfonate, sulfosuccinic esters, quaternary alkylammonium salts, alkylbenzylammonium salts, such as dimethyl-$C_{12}$- to $C_{18}$-alkylbenzylammonium chlorides, primary, secondary and tertiary fatty amine salts, quaternary amidoamine compounds, alkylpyridinium salts, alkylimidazolinium salts and alkyloxazolinium salts.

Suitable emulsifiers include for example sodium diethyl hexyl sulphosuccinate. This is available from BASF as Lumiten® I-SC.

In a preferred embodiment of the present invention, the first emulsion polymerization and/or the second emulsion polymerization is carried out in the presence of polymerization regulators. Suitable regulators are, for example, mercaptans, such as ethyl mercaptan, n-butyl mercaptan, tert-butyl mercaptan, n-dodecyl mercaptan or tert-dodecyl mercaptan, thioglycolic acid or carbon tetrabromide. Furthermore, suitable regulators are from the class consisting of the terpenes, suitably from the class consisting of the monocyclic terpenes for instance from the group consisting of the menthadienes.

In the context of the present invention, terpene-containing polymerisation regulators are understood as meaning those hydrocarbons which are composed of isoprene units [$H_2C=C(CH_3)CH=CH_2$] and can consequently be derived from the isoprene rule. Terpenes are divided into monoterpenes ($C_{10}$), sesquiterpenes ($C_{15}$), diterpenes ($C_{20}$), sesterterpenes ($C_{25}$), triterpenes ($C_{30}$) and tetraterpenes ($C_{40}$) and polyterpenes ($>C_{40}$), substantially into acyclic, monocyclic, bicyclic and tricyclic terpenes. Terpenes are known to a person skilled in the art, for example from Römpp Chemie Lexikon, 9th extended and revised edition, 1989-1992, Georg Thieme Verlag Stuttgart.

In the narrower sense, terpenes are understood as meaning hydrocarbons having a $C_{10}H_{16}$ skeleton, and the hydrogenation and dehydrogenation derivatives thereof and the alcohols, ketones, aldehydes and esters derived therefrom.

According to the invention, monocyclic monoterpenes are preferably used, particularly preferably diunsaturated monocyclic monoterpenes (so-called p-menthadienes). Examples of diunsaturated monocyclic monoterpenes are α-, β- and γ-terpinene, terpinolene, (+)-(S)-α-phellandrene, (−)-(S)-α-phellandrene and limonene. α-terpinene and terpinolene are preferred and terpinolene is particularly preferred.

Of course, mixtures of said terpene-containing polymerisation regulators can also be used, but suitably only one terpene-containing polymerisation regulator is used, particularly suitably only terpinolene is used.

The polymerisation regulators, for instance the terpene containing compounds, are used in the polymerization in an amount of at least 0.01% by weight, based on the monomers. The amounts depend substantially on the efficiency of the chain-transfer agent or chain-transfer agents used in each case. They are usually in the range from 0.01 to 10% by weight, suitably from 0.05 to 5.0% by weight, and preferably between 0.05 and 1% by weight, based on the monomers (a), (b), (c), (d), (e) and (f) in regard to the first emulsion polymerisation and based on the monomers (i), (ii), (iii), and (iv) in regard to the second emulsion polymerisation.

In the second polymerization stage, finely divided, aqueous polymer dispersions which have cationic properties owing to the composition of the prepolymer are obtained. The mean particle size of the dispersed particles is, for example, from 5 to 250 nm, preferably <200 nm, particularly preferably from 10 to 150 nm. Mean particle size can be determined by means of a high performance particle sizer (HPPS) from Malvern using an He—Ne laser (633 nm) at a scattering angle of 173°.

The mean particle size may alternatively be determined by methods known to the person skilled in the art, such as, for example, laser correlation spectroscopy, ultracentrifuging or CHDF. A further measure of the particle size of the dispersed polymer particles is the LT value. For determining the LT value (light transmittance), the polymer dispersion to be investigated in each case is measured in 0.1% strength by weight aqueous formulation in a cell having an edge length of 2.5 cm with light of wavelength 600 nm. The mean particle size can be calculated from the measured values, cf. B. Verner, M. Bárta, B. Sedlácek, Tables of Scattering Functions for Spherical Particles, Prague 1976, Edice Marco, Rada D-DATA, SVAZEK D-1.

The polymer concentration of the aqueous dispersions obtained in the emulsion polymerization is, for example, from 15 to 45, preferably from 25 to 35, % by weight.

The invention also relates to a process for the preparation of a finely divided, cationic, aqueous polymer dispersion which is obtainable by emulsion polymerisation of ethylenically unsaturated monomers in an aqueous liquid containing a cationic prepolymer as a dispersant, wherein the cationic prepolymer is prepared in the presence of polymerisation initiators by polymerisation of (a) from 15 to 45% by weight of at least one ethylenically unsaturated monomer comprising at least one quaternary ammonium group;
(b) from 5 to 80% by weight of at least one optionally substituted styrene;
(c) from 0 to 50% by weight of at least one 01-12 alkyl (meth) acrylate;
(d) from 0 to 10% by weight of at least one ethylenically unsaturated monomer comprising an acid group;
(e) from 0 to 10% by weight of at least one ethylenically unsaturated monomer comprising an amine group; and
(f) from 0 to 20% by weight of at least one non-ionic ethylenically unsaturated monomer differing from (b), (c) and (e), the sum of (a)+(b)+(c)+(d)+(e)+(f) being 100% by weight, in a first emulsion polymerisation in the presence of at least one non-ionic emulsifier, and thereafter, in the aqueous liquid containing the cationic prepolymer, a second emulsion polymerisation is carried out, in the presence of polymerisation initiators, of a monomer mixture comprising (i) from 10 to 70% by weight of at least one of an optionally substituted styrene or (meth) acrylonitrile;
(ii) from 30 to 90% by weight of at least one 01_18 alkyl (meth) acrylate;
(iii) from 0 to 30% by weight of at least one vinyl ester of linear or branched $C_{1-30}$ carboxylic acids; and
(iv) from 0 to 30% by weight of at least one non-ionic ethylenically unsaturated monomer differing from (i), (ii) and (iii), the sum of (i)+(ii)+(iii)+(iv) being 100% by weight, and the first emulsion polymerisation and/or the second emulsion polymerisation is optionally carried out in the presence of from 0 to 10% by weight of at least one polymerisation regulator.

The finely divided, cationic aqueous polymer dispersions described above are used as sizes for paper, board and cardboard. They can be used for the production of all paper varieties, for example of writing and printing papers and packaging papers and papers for the packaging of liquids. They are suitable in particular for the surface sizing of paper products. The dispersions according to the invention can be processed by all methods suitable in surface sizing, but they can also be used for engine sizing. For use as a size, the aqueous polymer dispersions are diluted by adding water, generally to a polymer content of, for example, from 0.05 to 5% by weight. The amount of polymer dispersion depends on the desired degree of sizing of the papers or paper products to be finished. Such preparation solutions may comprise further substances, for example starch, dyes, optical brighteners, biocides, paper strength agents, fixing agents, antifoams, retention aids and/or drainage aids.

The size dispersion can be applied to paper, board or cardboard by means of a size press or other application units, such as a film press, speedsize or gate roll. The amount of polymer which is applied to the surface of paper products is, for example, from 0.005 to 1.0 g/m², preferably from 0.01 to 0.5 g/m².

Even in a very low dose, the polymer dispersions according to the invention exhibit an excellent sizing effect on all papers produced with different fiber types from unbleached softwood, unbleached deciduous wood, unbleached hardwood, bleached softwood, bleached deciduous wood, bleached hardwood, deinked fibers or mixtures of different fiber types. Furthermore, the dispersions according to the invention exhibit very good compatibility with the customary starches, for example potato starch, corn starch, wheat starch, tapioca starch. Moreover, the dispersions according to the invention exhibit complete development of sizing immediately after the production and drying of the paper web.

The invention also provides polymer dispersions which can be stable when used in sizing compositions at neutral pH and ambient temperatures.

The invention is illustrated in more detail with reference to the following, nonlimiting examples.

EXAMPLES

The percentage data in the examples are percent by weight, unless evident otherwise from the context.

The particle sizes were determined by means of a high performance particle sizer (HPPS) from Malvern using a He—Ne laser (633 nm) at a scattering angle of 173°.

Comparative Example 1, According to Example 13 of WO 2010/139683. Preparation of Comparative Dispersion 1

101.4 g of anhydrous acetic acid (glacial acetic acid) were initially taken in a plane-ground 2 l flask having a stirrer and internal temperature measurement and were heated to 105° C. under a nitrogen atmosphere. 155 g of styrene, 10 g of N,N-dimethylaminoethyl acrylate, 55 g of N,N-dimethylaminopropylmethacrylamide, and 5 g of acrylic acid were metered in with stirring in a period of 45 min at 105° C. Simultaneously with the monomer feed, the feed of 8.8 g of tert-butyl peroctanoate in 18.2 g of isopropanol was started and was metered in in the course of 60 min. The reaction mixture was then subjected to postpolymerization at 105° C. for 60 min.

870 g of demineralized water were then added to the homogeneous polymer material at 85° C. After addition of 1.5 g of 10% strength by weight iron(II) sulfate solution and 10 g of 10% strength by weight ascorbic acid solution, 20 g of 5% strength by weight hydrogen peroxide solution were added in the course of 30 min at 80° C. Thereafter, a mixture of 55 g of styrene and 220 g of tert-butyl acrylate was metered in at 80° C. over a period of 120 min. At the same time, 80 g of a 5% strength by weight hydrogen peroxide solution were added in a separate feed in a period of 150 min. After the end of the initiator feed, postpolymerization was effected for 30 min and cooling to 70° C. was effected. Thereafter, 10 g of a 10% strength by weight ascorbic acid solution were added and stirring was effected for a further 20 min. A further addition of 10 g of a 10% strength by weight ascorbic acid solution was effected. The reaction mixture was then stirred for a further 20 min. Finally, 5 g of a commercially available antifoam (Afranil® T from BASF SE) and 65 g of demineralized water were added and cooling to room temperature was effected. A finely divided polymer dispersion having a solids content of 30.4% by weight and particle size of 45 nm was obtained.

Example 1 (Preparation of Dispersion 1)

In a ground-joint 2 l flask equipped with stirrer and internal temperature measurement, 10.00 g (100% by weight) of Acetic acid, 16.25 g (80% by weight) of Dimethylaminoethyl acrylate methyl chloride, 2.00 g (100% by weight) of Bisomer™ MPEG 350 MA (Methoxypolyethylene glycol 350 methacrylate), available from GEO Specialty Chemicals, and 240.00 g demineralized water were added to the charge and heated up to 85° C. under stirring. Then 0.40 g (10% by weight) Iron (II) sulfate heptahydrate solution in water was added. Subsequently a feed of 16.00 g (5% by weight) hydrogen peroxide solution (initiator) was started and fed over 90 min. Concomitantly a mixture of 15.00 g of Styrene, 5.00 g of Methyl acrylate, 3.00 g of Methyl methacrylate and 2.00 g of acrylic acid was also fed over 60 min. At the end of the initiator feed the batch was further stirred for 30 min (post polymerisation) and afterwards a next initiator feed of 32.00 g (5% by weight) hydrogen peroxide solution started and fed over 120 min. At the same time a feed of 12.00 g of Styrene and 48.00 g of tert-Butyl acrylate was also started and fed over 120 min. At the end of the both initiator and monomer feeds the reaction mixture was further stirred for 60 min (post polymerization), then the reaction mixture was cooled down to the room temperature. A finely divided polymer dispersion having a solids content of 24.8% by weight and a particle size of 152 nm was obtained.

Example 2 (Preparation of Dispersion 2)

In a ground-joint 2 l flask equipped with stirrer and internal temperature measurement, 10.00 g (100% by weight) of Acetic acid, 16.25 g (80% by weight) of Dimethylaminoethyl acrylate methyl chloride, 2.00 g (100% by weight) of Bisomer™ MPEG 350 MA (Methoxypolyethylene glycol 350 methacrylate), available from GEO Specialty Chemicals, and 240.00 g demineralized water were added to the charge and heated up to 85° C. under stirring. Then 0.40 g (10% by weight) Iron (II) sulfate heptahydrate solution in water was added. Subsequently a feed of 16.00 g (5% by weight) hydrogen peroxide solution (initiator) was started and fed over 90 min. Concomitantly a mixture of 7.50 g of Styrene, 10.00 g of Methyl acrylate, 7.50 g of Methyl methacrylate and 0.50 g of Terpinolene (90% by weight) was also fed over 60 min. At the end of the initiator feed the batch was further stirred for 30 min (post polymerisation) and afterwards a next initiator feed of 32.00 g (5% by weight) hydrogen peroxide solution started and fed over 120 min. At the same time a feed of 12.00 g of Styrene and 48.00 g of tert-Butyl acrylate was also started and fed over 120 min. At the end of the both initiator and monomer feeds the reaction mixture was further stirred for 60 min (post polymerization), then the reaction mixture was cooled down to the room temperature. A finely divided polymer dispersion having a solids content of 25.3% by weight and a particle size of 178 nm was obtained.

Example 3 (Preparation of Dispersion 3)

In a ground-joint 2 l flask equipped with stirrer and internal temperature measurement, 10.00 g (100% by weight) of Acetic acid, 26.00 g (50% by weight) of 1-Vinylimidazole dimethyl sulfate quaternary salt, 2.00 g (100% by weight) of Bisomer™ MPEG 350 MA (Methoxypolyethylene glycol 350 methacrylate), available from GEO Specialty Chemicals, and 125.00 g demineralized water were added to the charge and heated up to 85° C. under stirring. Then 0.40 g (10% by weight) Iron (II) sulfate heptahydrate solution in water was added. Subsequently a feed of 16.00 g (5% by weight) hydrogen peroxide solution (initiator) was started and fed over 90 min. Concomitantly a mixture of 7.50 g of Styrene, 10.00 g of Methyl acrylate, 7.50 g of Methyl methacrylate, 0.56 g of Terpinolene (90% by weight), 0.09 g (58% by weight) of emulsifier Lumiten™ I-SC (sodium-di-ethyl-hexyl-sulfosuccinate), available from BASF SE, and 30.00 g demineralised water was also fed over 60 min. At the end of the initiator feed the batch was further stirred for 30 min (post polymerisation) and afterwards a next initiator feed of 32.00 g (5% by weight) hydrogen peroxide solution started and fed over 120 min. At the same time a feed of 12.00 g of Styrene, 48.00 g of tert-Butyl acrylate, 0.17 g (58% by weight) of emulsifier Lumiten™ I-SC (sodium-di-ethyl-hexyl-sulfosuccinate), available from BASF SE and 60.00 g demineralised water was also started and fed over 120 min. At the end of the both initiator and monomer feeds 10.00 g demineralized water were added to the reactor and the reaction mixture was further stirred for 60 min (post polymerization), then the reaction mixture was cooled down to the room temperature. A finely divided polymer dispersion having a solids content of 24.1% by weight and a particle size of 74 nm was obtained.

Example 4 (Preparation of Dispersion 4)

In a ground-joint 2 l flask equipped with stirrer and internal temperature measurement, 10.00 g (100% by weight) of Acetic acid, 26.00 g (50% by weight) of 1-Vinylimidazole dimethyl sulfate quaternary salt, 1.00 g (100% by weight) of Bisomer™ MPEG 350 MA (Methoxypolyethylene glycol 350 methacrylate), available from GEO Specialty Chemicals, and 125.00 g demineralized water were added to the charge and heated up to 85° C. under stirring. Then 0.40 g (10% by weight) Iron (II) sulfate heptahydrate solution in water was added. Subsequently a feed of 16.00 g (5% by weight) hydrogen peroxide solution (initiator) was started and fed over 90 min. Concomitantly a mixture of 16.00 g of Styrene, 5.00 g of Methyl acrylate, 5.00 g of Methyl methacrylate, 0.56 g of Terpinolene (90% by weight), 0.09 g (58% by weight) of emulsifier Lumiten™ I-SC (sodium-di-ethyl-hexyl-sulfosuccinate), available from BASF SE, and 30.00 g demineralised water was also fed over 60 min. At the end of the initiator feed the batch was further stirred for 30 min (post polymerisation) and afterwards a next initiator feed of 32.00 g (5% by weight) hydrogen peroxide solution started and fed over 120 min. At the same time a feed of 12.00 g of Styrene, 48.00 g of tert-Butyl acrylate, 0.17 g (58% by weight) of emulsifier Lumiten™ I-SC (sodium-di-ethyl-hexyl-sulfosuccinate) and 60.00 g demineralised water was also started and fed over 120 min. At the end of the both initiator and monomer feeds 10.00 g demineralized water were added to the reactor and the reaction mixture was further stirred for 60 min (post polymerization), then the reaction mixture was cooled down to the room temperature. A finely divided polymer dispersion having a solids content of 23.2% by weight and a particle size of 104 nm was obtained.

Example 5 (Preparation of Dispersion 5)

In a ground-joint 2 l flask equipped with stirrer and internal temperature measurement, 10.00 g (100% by weight) of Acetic acid, 26.00 g (50% by weight) of 1-Vinylimidazole dimethyl sulfate quaternary salt, 1.00 g (100% by weight) of Bisomer™ MPEG 350 MA (Methoxypolyethylene glycol 350 methacrylate), available from GEO Specialty Chemicals, and 125.00 g demineralized water were added to the charge and heated up to 85° C. under stirring. Then 0.40 g (10% by weight) Iron (II) sulfate heptahydrate solution in water was added. Subsequently a feed of 16.00 g (5% by weight) hydrogen peroxide solution (initiator) was started and fed over 90 min. Concomitantly a mixture of 26.00 g of Styrene, 0.56 g of Terpinolene (90% by weight), 0.09 g (58% by weight) of emulsifier Lumiten™ I-SC (sodium-di-ethyl-hexyl-sulfosuccinate), available from BASF SE, and 30.00 g demineralised water was also fed over 60 min. At the end of the initiator feed the batch was further stirred for 30 min (post polymerisation) and afterwards a next initiator feed of 32.00 g (5% by weight) hydrogen peroxide solution started and fed over 120 min. At the same time a feed of 12.00 g of Styrene, 48.00 g of tert-Butyl acrylate, 0.17 g (58% by weight) of emulsifier Lumiten™ I-SC (sodium-di-ethyl-hexyl-sulfosuccinate) and 60.00 g demineralised water was also started and fed over 120 min. At the end of the both initiator and monomer feeds 10.00 g demineralized water were added to the reactor and the reaction mixture was further stirred for 60 min (post polymerization), then the reaction mixture was cooled down to the room temperature. A finely divided polymer dispersion having a solids content of 23.6% by weight and a particle size of 145 nm was obtained.

Example 6 (Preparation of Dispersion 6)

In a ground-joint 2 l flask equipped with stirrer and internal temperature measurement, 10.00 g (100% by weight) of Acetic acid, 26.00 g (50% by weight) of 1-Vinylimidazole dimethyl sulfate quaternary salt, 5.00 g (20% by weight) of Lutensol™ AT 25 are available from BASF SE, and 120.00 g demineralized water were added to the charge and heated up to 85° C. under stirring. Then 0.40 g (10% by weight) Iron (II) sulfate heptahydrate solution in water was added. Subsequently a feed of 16.00 g (5% by weight) hydrogen peroxide solution (initiator) was started and fed over 90 min. Concomitantly a mixture of 27.00 g of Styrene, 0.56 g of Terpinolene (90% by weight), 0.09 g (58% by weight) of emulsifier Lumiten™ I-SC (sodium-di-ethyl-hexyl-sulfosuccinate), available from BASF SE, and 30.00 g demineralised water was also fed over 60 min. At the end of the initiator feed the batch was further stirred for 30 min (post polymerisation) and afterwards a next initiator feed of 32.00 g (5% by weight) hydrogen peroxide solution started and fed over 120 min. At the same time a feed of 12.00 g of Styrene, 48.00 g of tert-Butyl acrylate, 0.17 g (58% by weight) of emulsifier Lumiten™ I-SC (sodium-di-ethyl-hexyl-sulfosuccinate) and 60.00 g demineralised water was also started and fed over 120 min. At the end of the both initiator and monomer feeds 10.00 g demineralized water were added to the reactor and the reaction mixture was further stirred for 60 min (post polymerization), then the reaction mixture was cooled down to the room temperature. A finely divided polymer dispersion having a solids content of 23.8% by weight and a particle size of 138 nm was obtained.

Example 7 (Preparation of Dispersion 7)

In a ground-joint 2 l flask equipped with stirrer and internal temperature measurement, 10.00 g (100% by weight) of Acetic acid, 26.00 g (50% by weight) of 1-Vinylimidazole dimethyl sulfate quaternary salt, 5.00 g (20% by weight) of Lutensol™ AT 25, available from BASF SE, and 120.00 g demineralized water were added to the charge and heated up to 85° C. under stirring. Then 0.40 g (10% by weight) Iron (II) sulfate heptahydrate solution in water was added. Subsequently a feed of 16.00 g (5% by weight) hydrogen peroxide solution (initiator) was started and fed over 90 min. Concomitantly a mixture of 17.00 g of Styrene, 5.00 g of Methyl acrylate, 5.00 g of Methyl methacrylate, 0.56 g of Terpinolene (90% by weight), 0.09 g (58% by weight) of emulsifier Lumiten™ I-SC (sodium-di-ethyl-hexyl-sulfosuccinate), available from BASF SE, and 30.00 g demineralised water was also fed over 60 min. At the end of the initiator feed the batch was further stirred for 30 min (post polymerisation) and afterwards a next initiator feed of 32.00 g (5% by weight) hydrogen peroxide solution started and fed over 120 min. At the same time a feed of 12.00 g of Styrene, 48.00 g of tert-Butyl acrylate, 0.17 g (58% by weight) of emulsifier Lumiten™ I-SC (sodium-di-ethyl-hexyl-sulfosuccinate) and 60.00 g demineralised water was also started and fed over 120 min. At the end of the both initiator and monomer feeds 10.00 g demineralized water were added to the reactor and the reaction mixture was further stirred for 60 min (post polymerization), then the reaction mixture was cooled down to the room temperature. A finely divided polymer dispersion having a solids content of 23.8% by weight and a particle size of 71 nm was obtained.

Example 8 (Preparation of Dispersion 8)

In a ground-joint 2 l flask equipped with stirrer and internal temperature measurement, 5.00 g (100% by weight) of Acetic acid, 26.00 g (50% by weight) of 1-Vinylimidazole dimethyl sulfate quaternary salt, 5.00 g (20% by weight) of Lutensol™ AT 25, available from BASF SE, and 125.00 g demineralized water were added to the charge and heated up to 85° C. under stirring. Then 0.40 g (10% by weight) Iron (II) sulfate heptahydrate solution in water was added. Subsequently a feed of 16.00 g (5% by weight) hydrogen peroxide solution (initiator) was started and fed over 90 min. Concomitantly a mixture of 22.00 g of Styrene, 5.00 g of Methyl acrylate, 0.56 g of Terpinolene (90% by weight), 0.09 g (58% by weight) of emulsifier Lumiten™ I-SC (sodium-di-ethyl-hexyl-sulfosuccinate), available from BASF SE, and 30.00 g demineralised water was also fed over 60 min. At the end of the initiator feed the batch was further stirred for 30 min (post polymerisation) and afterwards a next initiator feed of 32.00 g (5% by weight) hydrogen peroxide solution started and fed over 120 min. At the same time a feed of 12.00 g of Styrene, 48.00 g of tert-Butyl acrylate, 0.17 g (58% by weight) of emulsifier Lumiten™ I-SC (sodium-diethyl-hexyl-sulfosuccinate) and 60.00 g demineralised water was also started and fed over 120 min. At the end of the both initiator and monomer feeds 10.00 g demineralized water were added to the reactor and the reaction mixture was further stirred for 60 min (post polymerization), then the reaction mixture was cooled down to the room temperature. A finely divided polymer dispersion having a solids content of 24.2% by weight and a particle size of 88 nm was obtained.

Example 9 (Preparation of Dispersion 9)

In a ground-joint 2 l flask equipped with stirrer and internal temperature measurement, 10.00 g (100% by weight) of Formic acid, 26.00 g (50% by weight) of 1-Vinylimidazole dimethyl sulfate quaternary salt, 5.00 g (20% by weight) of Lutensol™ AT 25, available from BASF SE, and 120.00 g demineralized water were added to the charge and heated up to 85° C. under stirring. Then 0.40 g (10% by weight) Iron (II) sulfate heptahydrate solution in water was added. Subsequently a feed of 16.00 g (5% by weight) hydrogen peroxide solution (initiator) was started and fed over 90 min. Concomitantly a mixture of 22.00 g of Styrene, 5.00 g of Methyl acrylate, 0.56 g of Terpinolene (90% by weight), 0.09 g (58% by weight) of emulsifier Lumiten™ I-SC (sodium-di-ethyl-hexyl-sulfosuccinate), available from BASF SE, and 30.00 g demineralised water was also fed over 60 min. At the end of the initiator feed the batch was further stirred for 30 min (post polymerisation) and afterwards a next initiator feed of 32.00 g (5% by weight) hydrogen peroxide solution started and fed over 120 min. At the same time a feed of 12.00 g of Styrene, 48.00 g of tert-Butyl acrylate, 0.17 g (58% by weight) of emulsifier Lumiten™ I-SC (sodium-diethyl-hexyl-sulfosuccinate) and 60.00 g demineralised water was also started and fed over 120 min. At the end of the both initiator and monomer feeds 10.00 g demineralized water were added to the reactor and the reaction mixture was further stirred for 60 min (post polymerization), then the reaction mixture was cooled down to the room temperature. A finely divided polymer dispersion having a solids content of 23.4% by weight and a particle size of 120 nm was obtained.

Example 10 (Preparation of Dispersion 10)

In a ground-joint 2 l flask equipped with stirrer and internal temperature measurement, 5.00 g (100% by weight) of Formic acid, 26.00 g (50% by weight) of 1-Vinylimidazole dimethyl sulfate quaternary salt, 5.00 g (20% by weight) of Lutensol™ AT 25, available from BASF SE, and 125.00 g demineralized water were added to the charge and heated up to 85° C. under stirring. Then 0.40 g (10% by weight) Iron (II) sulfate heptahydrate solution in water was added. Subsequently a feed of 16.00 g (5% by weight) hydrogen peroxide solution (initiator) was started and fed over 90 min. Concomitantly a mixture of 22.00 g of Styrene, 5.00 g of Methyl acrylate, 0.56 g of Terpinolene (90% by weight), 0.09 g (58% by weight) of emulsifier Lumiten™ I-SC (sodium-di-ethyl-hexyl-sulfosuccinate), available from BASF SE, and 30.00 g demineralised water was also fed over 60 min. At the end of the initiator feed the batch was further stirred for 30 min (post polymerisation) and afterwards a next initiator feed of 32.00 g (5% by weight) hydrogen peroxide solution started and fed over 120 min. At the same time a feed of 12.00 g of Styrene, 48.00 g of tert-Butyl acrylate, 0.17 g (58% by weight) of emulsifier Lumiten™ I-SC (sodium-diethyl-hexyl-sulfosuccinate) and 60.00 g demineralised water was also started and fed over 120 min. At the end of the both initiator and monomer feeds 10.00 g demineralized water were added to the reactor and the reaction mixture was further stirred for 60 min (post polymerization), then the reaction mixture was cooled down to the room temperature. A finely divided polymer dispersion having a solids content of 23.8% by weight and a particle size of 92 nm was obtained.

Example 11 (Preparation of Dispersion 11)

In a ground-joint 2 l flask equipped with stirrer and internal temperature measurement, 10.00 g (100% by weight) of Acetic acid, 26.00 g (50% by weight) of 1-Vinylimidazole dimethyl sulfate quaternary salt, 2.50 g (20% by weight) of Lutensol™ AT 25, available from BASF SE, and 120.00 g demineralized water were added to the charge and heated up to 85° C. under stirring. Then 0.40 g (10% by weight) Iron (II) sulfate heptahydrate solution in water was added. Subsequently a feed of 16.00 g (5% by weight) hydrogen peroxide solution (initiator) was started and fed over 90 min. Concomitantly a mixture of 22.00 g of Styrene, 5.00 g of Methyl acrylate, 0.56 g of Terpinolene (90% by weight), 0.09 g (58% by weight) of emulsifier Lumiten™ I-SC (sodium-di-ethyl-hexyl-sulfosuccinate), available from BASF SE, and 30.00 g demineralised water was also fed over 60 min. At the end of the initiator feed the batch was further stirred for 30 min (post polymerisation) and afterwards a next initiator feed of 32.00 g (5% by weight) hydrogen peroxide solution started and fed over 120 min. At the same time a feed of 12.00 g of Styrene, 48.00 g of tert-Butyl acrylate, 0.17 g (58% by weight) of emulsifier Lumiten™ I-SC (sodium-diethyl-hexyl-sulfosuccinate) and 60.00 g demineralised water was also started and fed over 120 min. At the end of the both initiator and monomer feeds 10.00 g demineralized water were added to the reactor and the reaction mixture was further stirred for 60 min (post polymerization), then the reaction mixture was cooled down to the room temperature. A finely divided polymer dispersion having a solids content of 24.4% by weight and a particle size of 102 nm was obtained.

Example 12 (Preparation of Dispersion 12)

In a ground-joint 2 l flask equipped with stirrer and internal temperature measurement, 10.00 g (100% by weight) of Acetic acid, 26.00 g (50% by weight) of 1-Vinylimidazole dimethyl sulfate quaternary salt, 5.00 g (20% by weight) of Lutensol™ AT 18, available from BASF SE, and 120.00 g demineralized water were added to the charge and heated up to 85° C. under stirring. Then 0.40 g (10% by weight) Iron (II) sulfate heptahydrate solution in water was added. Subsequently a feed of 16.00 g (5% by weight) hydrogen peroxide solution (initiator) was started and fed over 90 min. Concomitantly a mixture of 22.00 g of Styrene, 5.00 g of Methyl acrylate, 0.56 g of Terpinolene (90% by weight), 0.09 g (58% by weight) of emulsifier Lumiten™ I-SC (sodium-di-ethyl-hexyl-sulfosuccinate), available from BASF SE, and 30.00 g demineralised water was also fed over 60 min. At the end of the initiator feed the batch was further stirred for 30 min (post polymerisation) and afterwards a next initiator feed of 32.00 g (5% by weight) hydrogen peroxide solution started and fed over 120 min. At the same time a feed of 12.00 g of Styrene, 48.00 g of tert-Butyl acrylate, 0.17 g (58% by weight) of emulsifier Lumiten™ I-SC (sodium-diethyl-hexyl-sulfosuccinate) and 60.00 g demineralised water was also started and fed over 120 min. At the end of the both initiator and monomer feeds 10.00 g demineralized water were added to the reactor and the reaction mixture was further stirred for 60 min (post polymerization), then the reaction mixture was cooled down to the room temperature. A finely divided polymer dispersion having a solids content of 23.8% by weight and a particle size of 160 nm was obtained.

Example 13 (Preparation of Dispersion 13)

In a ground-joint 2 l flask equipped with stirrer and internal temperature measurement, 10.00 g (100% by weight) of Acetic acid, 26.00 g (50% by weight) of 1-Vinylimidazole dimethyl sulfate quaternary salt, 5.00 g (20% by weight) of Lutensol™ AT 50, available from BASF SE, and 120.00 g demineralized water were added to the charge and heated up to 85° C. under stirring. Then 0.40 g (10% by weight) Iron (II) sulfate heptahydrate solution in water was added. Subsequently a feed of 16.00 g (5% by weight) hydrogen peroxide solution (initiator) was started and fed over 90 min. Concomitantly a mixture of 22.00 g of Styrene, 5.00 g of Methyl acrylate, 0.56 g of Terpinolene (90% by weight), 0.09 g (58% by weight) of emulsifier Lumiten™ I-SC (sodium-di-ethyl-hexyl-sulfosuccinate), available from BASF SE, and 30.00 g demineralised water was also fed over 60 min. At the end of the initiator feed the batch was further stirred for 30 min (post polymerisation) and afterwards a next initiator feed of 32.00 g (5% by weight) hydrogen peroxide solution started and fed over 120 min. At the same time a feed of 12.00 g of Styrene, 48.00 g of tert-Butyl acrylate, 0.17 g (58% by weight) of emulsifier Lumiten™ I-SC (sodium-diethyl-hexyl-sulfosuccinate) and 60.00 g demineralised water was also started and fed over 120 min. At the end of the both initiator and monomer feeds 10.00 g demineralized water were added to the reactor and the reaction mixture was further stirred for 60 min (post polymerization), then the reaction mixture was cooled down to the room temperature. A finely divided polymer dispersion having a solids content of 24.4% by weight and a particle size of 96 nm was obtained.

Example 14 (Preparation of Dispersion 14)

In a ground-joint 2 l flask equipped with stirrer and internal temperature measurement, 10.00 g (100% by weight) of Acetic acid, 26.00 g (50% by weight) of 1-Vinylimidazole dimethyl sulfate quaternary salt, 5.00 g (20% by weight) of Lutensol™ AT 80, available from BASF SE, and 120.00 g demineralized water were added to the charge and heated up to 85° C. under stirring. Then 0.40 g (10% by weight) Iron (II) sulfate heptahydrate solution in water was added. Subsequently a feed of 16.00 g (5% by weight) hydrogen peroxide solution (initiator) was started and fed over 90 min. Concomitantly a mixture of 22.00 g of Styrene, 5.00 g of Methyl acrylate, 0.56 g of Terpinolene (90% by weight), 0.09 g (58% by weight) of emulsifier Lumiten™ I-SC (sodium-di-ethyl-hexyl-sulfosuccinate), available from BASF SE, and 30.00 g demineralised water was also fed over 60 min. At the end of the initiator feed the batch was further stirred for 30 min (post polymerisation) and afterwards a next initiator feed of 32.00 g (5% by weight) hydrogen peroxide solution started and fed over 120 min. At the same time a feed of 12.00 g of Styrene, 48.00 g of tert-Butyl acrylate, 0.17 g (58% by weight) of emulsifier Lumiten™ I-SC (sodium-diethyl-hexyl-sulfosuccinate) and 60.00 g demineralised water was also started and fed over 120 min. At the end of the both initiator and monomer feeds 10.00 g demineralized water were added to the reactor and the reaction mixture was further stirred for 60 min (post polymerization), then the reaction mixture was cooled down to the room temperature. A finely divided polymer dispersion having a solids content of 24.4% by weight and a particle size of 96 nm was obtained.

Example 15 (Preparation of Dispersion 15)

In a ground-joint 2 l flask equipped with stirrer and internal temperature measurement, 10.00 g (100% by weight) of Acetic acid, 30.00 g (50% by weight) of 1-Vinylimidazole dimethyl sulfate quaternary salt, 5.00 g (20% by weight) of Lutensol™ AT 25, available from BASF SE, and 120.00 g demineralized water were added to the charge and heated up to 85° C. under stirring. Then 0.40 g (10% by weight) Iron (II) sulfate heptahydrate solution in water was added. Subsequently a feed of 16.00 g (5% by weight) hydrogen peroxide solution (initiator) was started and fed over 90 min. Concomitantly a mixture of 20.00 g of Styrene, 5.00 g of Methyl acrylate, 0.56 g of Terpinolene (90% by weight), 0.09 g (58% by weight) of emulsifier Lumiten™

I-SC (sodium-di-ethyl-hexyl-sulfosuccinate), available from BASF SE, and 30.00 g demineralised water was also fed over 60 min. At the end of the initiator feed the batch was further stirred for 30 min (post polymerisation) and afterwards a next initiator feed of 32.00 g (5% by weight) hydrogen peroxide solution started and fed over 120 min. At the same time a feed of 12.00 g of Styrene, 48.00 g of tert-Butyl acrylate, 0.17 g (58% by weight) of emulsifier Lumiten™ I-SC (sodium-diethyl-hexyl-sulfosuccinate) and 60.00 g demineralised water was also started and fed over 120 min. At the end of the both initiator and monomer feeds 10.00 g demineralized water were added to the reactor and the reaction mixture was further stirred for 60 min (post polymerization), then the reaction mixture was cooled down to the room temperature. A finely divided polymer dispersion having a solids content of 24.1% by weight and a particle size of 82 nm was obtained.

Example 16 (Preparation of Dispersion 16)

In a ground-joint 2 l flask equipped with stirrer and internal temperature measurement, 10.00 g (100% by weight) of Acetic acid, 24.00 g (50% by weight) of 1-Vinylimidazole dimethyl sulfate quaternary salt, 5.00 g (20% by weight) of Lutensol™ AT 25, available from BASF SE, and 120.00 g demineralized water were added to the charge and heated up to 85° C. under stirring. Then 0.40 g (10% by weight) Iron (II) sulfate heptahydrate solution in water was added. Subsequently a feed of 16.00 g (5% by weight) hydrogen peroxide solution (initiator) was started and fed over 90 min. Concomitantly a mixture of 23.00 g of Styrene, 5.00 g of Methyl acrylate, 0.56 g of Terpinolene (90% by weight), 0.09 g (58% by weight) of emulsifier Lumiten™ I-SC (sodium-di-ethyl-hexyl-sulfosuccinate), available from BASF SE, and 30.00 g demineralised water was also fed over 60 min. At the end of the initiator feed the batch was further stirred for 30 min (post polymerisation) and afterwards a next initiator feed of 32.00 g (5% by weight) hydrogen peroxide solution started and fed over 120 min. At the same time a feed of 12.00 g of Styrene, 48.00 g of tert-Butyl acrylate, 0.17 g (58% by weight) of emulsifier Lumiten™ I-SC (sodium-diethyl-hexyl-sulfosuccinate) and 60.00 g demineralised water was also started and fed over 120 min. At the end of the both initiator and monomer feeds 10.00 g demineralized water were added to the reactor and the reaction mixture was further stirred for 60 min (post polymerization), then the reaction mixture was cooled down to the room temperature. A finely divided polymer dispersion having a solids content of 23.0% by weight and a particle size of 86 nm was obtained.

Example 17 (Preparation of Dispersion 17)

In a ground-joint 2 l flask equipped with stirrer and internal temperature measurement, 10.00 g (100% by weight) of Acetic acid, 22.00 g (50% by weight) of 1-Vinylimidazole dimethyl sulfate quaternary salt, 5.00 g (20% by weight) of Lutensol™ AT 25, available from BASF SE, and 120.00 g demineralized water were added to the charge and heated up to 85° C. under stirring. Then 0.40 g (10% by weight) Iron (II) sulfate heptahydrate solution in water was added. Subsequently a feed of 16.00 g (5% by weight) hydrogen peroxide solution (initiator) was started and fed over 90 min. Concomitantly a mixture of 24.00 g of Styrene, 5.00 g of Methyl acrylate, 0.56 g of Terpinolene (90% by weight), 0.09 g (58% by weight) of emulsifier Lumiten™ I-SC (sodium-di-ethyl-hexyl-sulfosuccinate), available from BASF SE, and 30.00 g demineralised water was also fed over 60 min. At the end of the initiator feed the batch was further stirred for 30 min (post polymerisation) and afterwards a next initiator feed of 32.00 g (5% by weight) hydrogen peroxide solution started and fed over 120 min. At the same time a feed of 12.00 g of Styrene, 48.00 g of tert-Butyl acrylate, 0.17 g (58% by weight) of emulsifier Lumiten™ I-SC (sodium-diethyl-hexyl-sulfosuccinate) and 60.00 g demineralised water was also started and fed over 120 min. At the end of the both initiator and monomer feeds 10.00 g demineralized water were added to the reactor and the reaction mixture was further stirred for 60 min (post polymerization), then the reaction mixture was cooled down to the room temperature. A finely divided polymer dispersion having a solids content of 24.4% by weight and a particle size of 90 nm was obtained.

Example 18 (Preparation of Dispersion 18)

In a ground-joint 2 l flask equipped with stirrer and internal temperature measurement, 10.00 g (100% by weight) of Acetic acid, 20.00 g (50% by weight) of 1-Vinylimidazole dimethyl sulfate quaternary salt, 5.00 g (20% by weight) of Lutensol™ AT 25, available from BASF SE, and 120.00 g demineralized water were added to the charge and heated up to 85° C. under stirring. Then 0.40 g (10% by weight) Iron (II) sulfate heptahydrate solution in water was added. Subsequently a feed of 16.00 g (5% by weight) hydrogen peroxide solution (initiator) was started and fed over 90 min. Concomitantly a mixture of 25.00 g of Styrene, 5.00 g of Methyl acrylate, 0.56 g of Terpinolene (90% by weight), 0.09 g (58% by weight) of emulsifier Lumiten™ I-SC (sodium-di-ethyl-hexyl-sulfosuccinate), available from BASF SE, and 30.00 g demineralised water was also fed over 60 min. At the end of the initiator feed the batch was further stirred for 30 min (post polymerisation) and afterwards a next initiator feed of 32.00 g (5% by weight) hydrogen peroxide solution started and fed over 120 min. At the same time a feed of 12.00 g of Styrene, 48.00 g of tert-Butyl acrylate, 0.17 g (58% by weight) of emulsifier Lumiten™ I-SC (sodium-diethyl-hexyl-sulfosuccinate) and 60.00 g demineralised water was also started and fed over 120 min. At the end of the both initiator and monomer feeds 10.00 g demineralized water were added to the reactor and the reaction mixture was further stirred for 60 min (post polymerization), then the reaction mixture was cooled down to the room temperature. A finely divided polymer dispersion having a solids content of 25.0% by weight and a particle size of 99 nm was obtained.

Example 19 (Preparation of Dispersion 19)

In a ground-joint 2 l flask equipped with stirrer and internal temperature measurement, 10.00 g (100% by weight) of Acetic acid, 18.00 g (50% by weight) of 1-Vinylimidazole dimethyl sulfate quaternary salt, 5.00 g (20% by weight) of emulsifier Lutensol™ AT 25, available from BASF SE, and 120.00 g demineralized water were added to the charge and heated up to 85° C. under stirring. Then 0.40 g (10% by weight) Iron (II) sulfate heptahydrate solution in water was added. Subsequently a feed of 16.00 g (5% by weight) hydrogen peroxide solution (initiator) was started and fed over 90 min. Concomitantly a mixture of 26.00 g of Styrene, 5.00 g of Methyl acrylate, 0.56 g of Terpinolene (90% by weight), 0.09 g (58% by weight) of emulsifier Lumiten™ I-SC (sodium-di-ethyl-hexyl-sulfosuccinate), available from BASF SE, and 30.00 g demineralised water was also fed over 60 min. At the end of the initiator feed the batch was further stirred for 30 min (post polymerisation) and afterwards a next initiator feed of 32.00 g (5% by weight) hydrogen peroxide solution started and fed over 120 min. At the same time a feed of 12.00 g of Styrene, 48.00 g of tert-Butyl acrylate, 0.17 g (58% by weight) of emulsifier Lumiten™ I-SC (sodium-di-ethyl-hexyl-sulfosuccinate) and 60.00 g demineralised water was also started and fed over 120 min. At the end of the both initiator and monomer feeds 10.00 g demineralized water were added to the reactor and the reaction mixture was further stirred for 60 min (post polymerization), then the reaction mixture was cooled down to the room temperature. A finely divided polymer dispersion having a solids content of 24.5% by weight and a particle size of 103 nm was obtained.

Example 20 (Preparation of Dispersion 20)

In a ground-joint 2 l flask equipped with stirrer and internal temperature measurement, 10.00 g (100% by weight) of Acetic acid, 16.00 g (50% by weight) of 1-Vinylimidazole dimethyl sulfate quaternary salt, 5.00 g (20% by weight) of emulsifier Lutensol™ AT 25, available from BASF SE, and 120.00 g demineralized water were added to the charge and heated up to 85° C. under stirring. Then 0.40 g (10% by weight) Iron (II) sulfate heptahydrate solution in water was added. Subsequently a feed of 16.00 g (5% by weight) hydrogen peroxide solution (initiator) was started and fed over 90 min. Concomitantly a mixture of 27.00 g of Styrene, 5.00 g of Methyl acrylate, 0.56 g of Terpinolene (90% by weight), 0.09 g (58% by weight) of emulsifier Lumiten™ I-SC (sodium-di-ethyl-hexyl-sulfosuccinate), available from BASF SE, and 30.00 g demineralised water was also fed over 60 min. At the end of the initiator feed the batch was further stirred for 30 min (post polymerisation) and afterwards a next initiator feed of 32.00 g (5% by weight) hydrogen peroxide solution started and fed over 120 min. At the same time a feed of 12.00 g of Styrene, 48.00 g of tert-Butyl acrylate, 0.17 g (58% by weight) of emulsifier Lumiten™ I-SC (sodium-di-ethyl-hexyl-sulfosuccinate) and 60.00 g demineralised water was also started and fed over 120 min. At the end of the both initiator and monomer feeds 10.00 g demineralized water were added to the reactor and the reaction mixture was further stirred for 60 min (post polymerization), then the reaction mixture was cooled down to the room temperature. A finely divided polymer dispersion having a solids content of 24.5% by weight and a particle size of 130 nm was obtained.

Example 21 (Preparation of Dispersion 21)

In a ground-joint 2 l flask equipped with stirrer and internal temperature measurement, 10.00 g (100% by weight) of Acetic acid, 14.00 g (50% by weight) of 1-Vinylimidazole dimethyl sulfate quaternary salt, 5.00 g (20% by weight) of emulsifier Lutensol™ AT 25, available from BASF SE, and 120.00 g demineralized water were added to the charge and heated up to 85° C. under stirring. Then 0.40 g (10% by weight) Iron (II) sulfate heptahydrate solution in water was added. Subsequently a feed of 16.00 g (5% by weight) hydrogen peroxide solution (initiator) was started and fed over 90 min. Concomitantly a mixture of 28.00 g of Styrene, 5.00 g of Methyl acrylate, 0.56 g of Terpinolene (90% by weight), 0.09 g (58% by weight) of emulsifier Lumiten™ I-SC (sodium-di-ethyl-hexyl-sulfosuccinate), available from BASF SE, and 30.00 g demineralised water was also fed over 60 min. At the end of the initiator feed the batch was further stirred for 30 min (post polymerisation) and afterwards a next initiator feed of 32.00 g (5% by weight) hydrogen peroxide solution started and fed over 120 min. At the same time a feed of 12.00 g of Styrene, 48.00 g of tert-Butyl acrylate, 0.17 g (58% by weight) of emulsifier Lumiten™ I-SC (sodium-di-ethyl-hexyl-sulfosuccinate) and 60.00 g demineralised water was also started and fed over 120 min. At the end of the both initiator and monomer feeds 10.00 g demineralized water were added to the reactor and the reaction mixture was further stirred for 60 min (post polymerization), then the reaction mixture was cooled down to the room temperature. A finely divided polymer dispersion having a solids content of 24.8% by weight and a particle size of 117 nm was obtained.

Example 22 (Preparation of Dispersion 22)

In a ground-joint 2 l flask equipped with stirrer and internal temperature measurement, 10.00 g (100% by weight) of Acetic acid, 12.00 g (50% by weight) of 1-Vinylimidazole dimethyl sulfate quaternary salt, 5.00 g (20% by weight) of emulsifier Lutensol™ AT 25, available from BASF SE, and 120.00 g demineralized water were added to the charge and heated up to 85° C. under stirring. Then 0.40 g (10% by weight) Iron (II) sulfate heptahydrate solution in water was added. Subsequently a feed of 16.00 g (5% by weight) hydrogen peroxide solution (initiator) was started and fed over 90 min. Concomitantly a mixture of 29.00 g of Styrene, 5.00 g of Methyl acrylate, 0.56 g of Terpinolene (90% by weight), 0.09 g (58% by weight) of emulsifier Lumiten™ I-SC (sodium-di-ethyl-hexyl-sulfosuccinate), available from BASF SE, and 30.00 g demineralised water was also fed over 60 min. At the end of the initiator feed the batch was further stirred for 30 min (post polymerisation) and afterwards a next initiator feed of 32.00 g (5% by weight) hydrogen peroxide solution started and fed over 120 min. At the same time a feed of 12.00 g of Styrene, 48.00 g of tert-Butyl acrylate, 0.17 g (58% by weight) of emulsifier Lumiten™ I-SC (sodium-di-ethyl-hexyl-sulfosuccinate) and 60.00 g demineralised water was also started and fed over 120 min. At the end of the both initiator and monomer feeds 10.00 g demineralized water were added to the reactor and the reaction mixture was further stirred for 60 min (post polymerization), then the reaction mixture was cooled down to the room temperature. A finely divided polymer dispersion having a solids content of 24.6% by weight and a particle size of 122 nm was obtained.

Example 23 (Preparation of Dispersion 23)

In a ground-joint 2 l flask equipped with stirrer and internal temperature measurement, 10.00 g (100% by weight) of Acetic acid, 20.00 g (50% by weight) of 1-Vinylimidazole dimethyl sulfate quaternary salt, 15.00 g (20% by weight) of emulsifier Lutensol™ AT 25, available from BASF SE, and 120.00 g demineralized water were added to the charge and heated up to 85° C. under stirring. Then 0.40 g (10% by weight) Iron (II) sulfate heptahydrate solution in water was added. Subsequently a feed of 16.00 g (5% by weight) hydrogen peroxide solution (initiator) was started and fed over 90 min. Concomitantly a mixture of 25.00 g of Styrene, 5.00 g of Methyl acrylate, 0.56 g of Terpinolene (90% by weight), 0.09 g (58% by weight) of emulsifier Lumiten™ I-SC (sodium-di-ethyl-hexyl-sulfosuccinate), available from BASF SE, and 30.00 g demineralised water was also fed over 60 min. At the end of the initiator feed the batch was further stirred for 30 min (post polymerisation)

and afterwards a next initiator feed of 32.00 g (5% by weight) hydrogen peroxide solution started and fed over 120 min. At the same time a feed of 12.00 g of Styrene, 48.00 g of tert-Butyl acrylate, 0.17 g (58% by weight) of emulsifier Lumiten™ I-SC (sodium-di-ethyl-hexyl-sulfosuccinate) and 60.00 g demineralised water was also started and fed over 120 min. At the end of the both initiator and monomer feeds 10.00 g demineralized water were added to the reactor and the reaction mixture was further stirred for 60 min (post polymerization), then the reaction mixture was cooled down to the room temperature. A finely divided polymer dispersion having a solids content of 24.4% by weight and a particle size of 72 nm was obtained.

Example 24 (Preparation of Dispersion 24)

In a ground-joint 2 l flask equipped with stirrer and internal temperature measurement, 10.00 g (100% by weight) of Acetic acid, 20.00 g (50% by weight) of 1-Vinylimidazole dimethyl sulfate quaternary salt, 5.00 g (20% by weight) of emulsifier Lutensol™ AT 25, available from BASF SE, and 120.00 g demineralized water were added to the charge and heated up to 85° C. under stirring. Then 0.40 g (10% by weight) Iron (II) sulfate heptahydrate solution in water was added. Subsequently a feed of 16.00 g (5% by weight) hydrogen peroxide solution (initiator) was started and fed over 90 min. Concomitantly a mixture of 20.00 g of Styrene, 10.00 g of n-Butyl acrylate, 0.56 g of Terpinolene (90% by weight), 0.09 g (58% by weight) of emulsifier Lumiten™ I-SC (sodium-di-ethyl-hexyl-sulfosuccinate), available from BASF SE, and 30.00 g demineralised water was also fed over 60 min. At the end of the initiator feed the batch was further stirred for 30 min (post polymerisation) and afterwards a next initiator feed of 32.00 g (5% by weight) hydrogen peroxide solution started and fed over 120 min. At the same time a feed of 12.00 g of Styrene, 48.00 g of tert-Butyl acrylate, 0.17 g (58% by weight) of emulsifier Lumiten™ I-SC (sodium-di-ethyl-hexyl-sulfosuccinate) and 60.00 g demineralised water was also started and fed over 120 min. At the end of the both initiator and monomer feeds 10.00 g demineralized water were added to the reactor and the reaction mixture was further stirred for 60 min (post polymerization), then the reaction mixture was cooled down to the room temperature. A finely divided polymer dispersion having a solids content of 24.4% by weight and a particle size of 92 nm was obtained.

Example 25 (Preparation of Dispersion 25)

In a ground-joint 2 l flask equipped with stirrer and internal temperature measurement, 10.00 g (100% by weight) of Acetic acid, 18.75 g (80% by weight) of Dimethylaminoethyl acrylate methyl chloride, 2.00 g (100% by weight) of Bisomer™ MPEG 350 MA (Methoxypolyethylene glycol 350 methacrylate), available from GEO Specialty Chemicals, and 240.00 g demineralized water were added to the charge and heated up to 85° C. under stirring. Then 0.40 g (10% by weight) Iron (II) sulfate heptahydrate solution in water was added. Subsequently a feed of 16.00 g (5% by weight) hydrogen peroxide solution (initiator) was started and fed over 90 min. Concomitantly a mixture of 21.00 g of Styrene, 2.00 g of Acrylic acid and 0.50 g of Terpinolene (90% by weight) was also fed over 60 min. At the end of the initiator feed the batch was further stirred for 30 min (post polymerisation) and afterwards a next initiator feed of 32.00 g (5% by weight) hydrogen peroxide solution started and fed over 120 min. At the same time a feed of 12.00 g of Styrene, 48.00 g of tert-Butyl acrylate, 0.17 g (58% by weight) of emulsifier Lumiten™ I-SC (sodium-di-ethyl-hexyl-sulfosuccinate), available from BASF SE, and 60.00 g demineralised water was also started and fed over 120 min. At the end of the both initiator and monomer feeds the reaction mixture was further stirred for 60 min (post polymerization), then the reaction mixture was cooled down to the room temperature. A finely divided polymer dispersion having a solids content of 25% by weight and a particle size of 245 nm was obtained.

Example 26 (Preparation of Dispersion 26)

In a ground-joint 2 l flask equipped with stirrer and internal temperature measurement, 15.00 g (100% by weight) of Acetic acid, 24 g (50% by weight) of 1-Vinylimidazole dimethyl sulfate quaternary salt, 15 g (50% by weight) of Maltodextrine 019S1 (available from Cargill) and 225.00 g demineralized water were added to the charge and heated up to 85° C. under stirring. Then 0.60 g (10% by weight) Iron (II) sulfate heptahydrate solution in water was added. Subsequently a feed of 60.00 g (5% by weight) hydrogen peroxide solution (initiator) was started and fed over 45 min. After 5 minutes from the start of the initiator feed a mixture of 18.00 g of Styrene and 15.00 g of n-Butyl acrylate was also fed over 30 min. At the end of the initiator feed the batch was further stirred for 30 min (post polymerisation) and afterwards a next initiator feed of 30.00 g (5% by weight) hydrogen peroxide solution started and fed over 120 min. At the same time a feed of 30.00 g of Styrene, 75.00 g of tert-Butyl acrylate was also started and fed over 90 min. At the end of the initiator feed 15.00 g demineralized water were added and the reaction mixture was further stirred for 30 min (post polymerization). During this time the reaction mixture was cooled down to 50° C. At 50° C. 3.0 g (10% by weight) of a tertiary butyl hydroperoxide solution was added and stirred for 30 minutes (post polymerization). A finely divided polymer dispersion having a solids content of 30.9% by weight and a particle size of 185 nm was obtained.

Example 27 (Preparation of Dispersion 27)

In a ground-joint 2 l flask equipped with stirrer and internal temperature measurement, 15.00 g (100% by weight) of Acetic acid, 30.00 g (50% by weight) of 1-Vinylimidazole dimethyl sulfate quaternary salt, 3.00 g (20% by weight) of emulsifier Lutensol™ AT 25, available from BASF SE, and 225.00 g demineralized water were added to the charge and heated up to 85° C. under stirring. Then 0.60 g (10% by weight) Iron (II) sulfate heptahydrate solution in water was added. Subsequently a feed of 60.00 g (5% by weight) hydrogen peroxide solution (initiator) was started and fed over 45 min. After 5 minutes from the start of the initiator feed a mixture of 15.00 g of Styrene, 15.00 g of n-Butyl acrylate and 0.38 g 2-Ethylhexyl thioglycolate was also fed over 30 min. At the end of the initiator feed the batch was further stirred for 30 min (post polymerisation) and afterwards a next initiator feed of 30.00 g (5% by weight) hydrogen peroxide solution started and fed over 120 min. At the same time a feed of 30.00 g of Styrene, 75.00 g of tert-Butyl acrylate was also started and fed over 90 min. At the end of the initiator feed 15.00 g demineralized water were added and the reaction mixture was further stirred for 30 min (post polymerization). During this time the reaction mixture was cooled down to 50° C. At 50° C. 3.0 g (10% by weight) of a tertiary butyl hydroperoxide solution was added and stirred for 30 minutes (post polymerization). A finely divided polymer dispersion having a solids content of 30.9% by weight and a particle size of 82 nm was obtained.

Example 28 (Preparation of Dispersion 28)

In a ground-joint 2 l flask equipped with stirrer and internal temperature measurement, 15.00 g (100% by weight) of Acetic acid, 30.00 g (50% by weight) of 1-Vinylimidazole dimethyl sulfate quaternary salt, 3.00 g (20% by weight) of emulsifier Lutensol™ AT 25, available from BASF SE, and 225.00 g demineralized water were added to the charge and heated up to 85° C. under stirring. Then 0.60 g (10% by weight) Iron (II) sulfate heptahydrate solution in water was added. Subsequently a feed of 60.00 g (5% by weight) hydrogen peroxide solution (initiator) was started and fed over 45 min. After 5 minutes from the start of the initiator feed a mixture of 15.00 g of Styrene, 15.00 g of n-Butyl acrylate and 0.83 g Terpinolene (90% by weight), was also fed over 30 min. At the end of the initiator feed the batch was further stirred for 30 min (post polymerisation) and afterwards a next initiator feed of 30.00 g (5% by weight) hydrogen peroxide solution started and fed over 120 min. At the same time a feed of 30.00 g of Styrene, 75.00 g of tertButyl acrylate was also started and fed over 90 min. At the end of the initiator feed 15.00 g demineralized water were added and the reaction mixture was further stirred for 30 min (post polymerization). During this time the reaction mixture was cooled down to 50° C. At 50° C. 3.0 g (10% by weight) of a tertiary butyl hydroperoxide solution was added and stirred for 30 minutes (post polymerization). A finely divided polymer dispersion having a solids content of 30.8% by weight and a particle size of 118 nm was obtained.

Example 29 (Preparation of Dispersion 29)

In a ground-joint 2 l flask equipped with stirrer and internal temperature measurement, 15.00 g (100% by weight) of Acetic acid, 30.00 g (50% by weight) of 1-Vinylimidazole dimethyl sulfate quaternary salt, 3.00 g (20% by weight) of emulsifier Lutensol™ AT 25, available from BASF SE, and 97.50 g demineralized water were added to the charge and heated up to 85° C. under stirring. Then 0.60 g (10% by weight) Iron (II) sulfate heptahydrate solution in water was added. Subsequently a feed of 24.00 g (5% by weight) hydrogen peroxide solution (initiator) was started and fed over 90 min. Concomitently a mixture of 30.00 g of Styrene, 15.00 g of n-Butyl acrylate and 0.83 g Terpinolene (90% by weight), was also fed over 60 min. At the end of the initiator feed the batch was further stirred for 30 min (post polymerisation) and afterwards a next initiator feed of 48.00 g (5% by weight) hydrogen peroxide solution started and fed over 120 min. At the same time a feed of 30.00 g of Styrene, 60.00 g of tert-Butyl acrylate was also started and fed over 120 min. At the end of the initiator feed 15.00 g demineralized water were added and the reaction mixture was further stirred for 30 min (post polymerization). During this time the reaction mixture was cooled down to 50° C. At 50° C. 3.0 g (10% by weight) of a tertiary butyl hydroperoxide solution was added and stirred for 30 minutes (post polymerization). A finely divided polymer dispersion having a solids content of 42.9% by weight and a particle size of 181 nm was obtained.

Testing of performance characteristics of polymer dispersions 1 to 29 obtained according to the examples 1 to 29 and the comparative dispersion 1 prepared in the comparative example, 1.

The pH stability tests were carried out by adding a solution of NaOH (25% wt) until pH 7 was reached. The samples which are stable (during the pH adjustment no coagulation can be observed) are beeing stored at 25° C. for 1 h. The dispersion is then pH stable, when it is not affected after this treatment—this is where no coagulum can be observed.

Performance Testing of Polymer Dispersions 1 to 25 Produced in Examples 1 to 25 and Comparative Dispersion 1 Produced an Comparative Example 1:

To test the surface-sizing effect in use, the inventive dispersions and the comparative dispersions were applied by means of a laboratory size press to liner paper (100% reclaimed paper, 80 g/m2 basis weight, unsized). The aqueous solution of a degraded corn starch was adjusted at the desired concentration. The dispersions to be tested were then added to the starch solution such that the so produced size press liquor comprised 60 g/l of a degraded corn starch, 0.3-0.5 g/l of the dispersions (see Table 1) in the presence of poly aluminium chloride (PAC) at a dosage of 2 g PAC solid per litre of starch solution of the final size press liquor containing PAC. I The respective sizing effects of the dispersions 1 to 25 obtained as described in Examples 1 to 25 and Comparative example 1 were then determined by surface application of the size press liquor to the unsized test paper. The size press liquor was applied at a temperature of 55° C., a speed of 2 m/min, and a pressure of 1 bar. To this end, the paper was passed twice through the size press, an average weight increase of about 65% being achieved.

The surface-sized papers were dried on a drying cylinder at 120° C. The papers were subsequently stored overnight in a conditioned room (23° C., 50% relative humidity) before the degree of sizing was determined.

To determine the degree of sizing of the surface-sized papers, the Cobb60 and Cobb120 values were determined according to DIN 53 132. The Cobb60 value is defined as the water absorption of the paper sheet in g/m2 after contact with water and a contact time of 60 s (or 120 s in the case of the Cobb120 value). The lower the Cobb value, the better the sizing effect of the dispersion used.

The sizing and stability results for Polymer Dispersions 1 to 25 are shown in Table 1.

TABLE 1

|  | $Cobb_{60}$-Value [g/m$^2$] Dose [g/l solid] | | | $Cobb_{120}$-Value [g/m$^2$] | Stable dispersion at pH 7 |
|---|---|---|---|---|---|
|  | 0.3 | 0.4 | 0.5 | 0.5 | @25° C. |
| Comparative Dispersion 1 | 43 | 30 | 22 | 32 | no |
| Dispersion 1 | 44 | 36 | 34 | 92 | no |
| Dispersion 2 | 46 | 31 | 30 | 69 | no |
| Dispersion 3 | 56 | 34 | 28 | 56 | yes |
| Dispersion 4 | 81 | 46 | 30 | 51 | yes |
| Dispersion 5 | 80 | 52 | 32 | 67 | yes |
| Dispersion 6 | 70 | 55 | 37 | 74 | yes |
| Dispersion 7 | 77 | 41 | 29 | 56 | yes |
| Dispersion 8 | 48 | 38 | 34 | 60 | yes |
| Dispersion 9 | 75 | 40 | 31 | 63 | yes |
| Dispersion 10 | 70 | 42 | 34 | 72 | yes |
| Dispersion 11 | 44 | 33 | 30 | 53 | yes |
| Dispersion 12 | 66 | 35 | 31 | 70 | yes |
| Dispersion 13 | 55 | 44 | 30 | 55 | yes |
| Dispersion 14 | 60 | 41 | 32 | 58 | yes |
| Dispersion 15 | 46 | 37 | 28 | 56 | yes |
| Dispersion 16 | 48 | 42 | 26 | 45 | yes |
| Dispersion 17 | 61 | 52 | 30 | 58 | yes |
| Dispersion 18 | 48 | 39 | 31 | 76 | yes |

TABLE 1-continued

| | Cobb$_{60}$-Value [g/m$^2$] Dose [g/l solid] | | | Cobb$_{120}$-Value [g/m$^2$] | Stable dispersion at pH 7 |
|---|---|---|---|---|---|
| | 0.3 | 0.4 | 0.5 | 0.5 | @25° C. |
| Dispersion 19 | 94 | 63 | 61 | 72 | yes |
| Dispersion 20 | 42 | 40 | 34 | 54 | yes |
| Dispersion 21 | 95 | 35 | 34 | 72 | yes |
| Dispersion 22 | 77 | 67 | 55 | 116 | no |
| Dispersion 23 | 50 | 39 | 28 | 88 | yes |
| Dispersion 24 | 82 | 47 | 34 | 75 | yes |
| Dispersion 25 | 37 | 34 | 33 | 54 | yes |

Performance Testing of Polymer Dispersions 26 to 29 Produced in Examples 26 to 29 and Comparative Dispersion 1 of Comparative Example 1:

Polymer Dispersions 26 to 29 and Comparative Polymer Dispersion 1 were evaluated in exactly the same manner as for Polymer Dispersions 1 to 25, except that the test was effected in the absence of PAC and the doses of the polymer dispersions contained in the sizing press liquor were 0.6, 0.8 and 1.0 g/l.

The sizing and stability results for Polymer Dispersions 1 to 25 are shown in Table 2.

TABLE 2

| | Cobb$_{60}$-Value [g/m$^2$] Dose [g/l solid] | | | Cobb$_{120}$-Value [g/m$^2$] | Stable dispersion at pH 7 |
|---|---|---|---|---|---|
| | 0.6 | 0.8 | 1.0 | 1.0 | at 25° C. |
| Comparative Dispersion 1 | 43 | 31 | 28 | 37 | no |
| Dispersion 26 | 90 | 50 | 40 | 83 | yes |
| Dispersion 27 | 57 | 40 | 32 | 51 | yes |
| Dispersion 28 | 47 | 31 | 29 | 46 | yes |
| Dispersion 29 | 119 | 62 | 44 | 115 | yes |

Example 30 (Preparation of Dispersion 30)

In a ground-joint flask equipped with stirrer and internal temperature measurement, 1.75 g (100% by weight of Acetic acid, 19.69 g (80% by weight) of Dimethylaminoethyl acrylate methyl chloride, 60.74 g (60% by weight) of Diallyl dimethyl ammonium chloride, 0.88 g (40% by weight) of Mersolat™ 40 (available from Lanxess Deutschland GmbH) and 17.50 g demineralized water were added to the charge and heated up to 85° C. under stirring. Then 0.14 g (100% by weight) Iron (II) sulfate heptahydrate was added. Subsequently a feed of 52.5 g (10% by weight) hydrogen peroxide solution (initiator) and 17.5 g (100% by weight) Isopropanol (chain transfer agent) was started and feed over 150 min. Concomitantly a mixture of 48.44 g of Styrene, 11.55 g of Methyl methacrylate, 9.98 g of Methyl acrylate, 8.37 g of Acrylic acid and 0.44 g (40% by weight) of Mersolat™ 40 was also feed over 120 min. At the end of the initiator feed the batch was further stirred for 30 min (post polymerization) and afterwards a next initiator feed of 175 g (10% by weight) hydrogen peroxide solution started and feed over 120 min. At the same time a feed of 107.73 g of Acrylonitrile, 86.17 g of n-Butyl acrylate, 21.56 g of 2-Ethylhexyl Acrylate, 1.37 g of Terpinolen, 0.44 g (40% by weight) of Mersolat™ 40 and 525 g of demineralized water was also started and feed over 120 min. At the end of the both initiator and monomer feeds the reaction mixture was further stirred for 60 min (post polymerization), then the reaction mixture was cooled down to the room temperature. A finely divided polymer dispersion having a solids content of 29.8% by weight and a particle size of 107.3 nm was obtained.

Example 31 (Preparation of Dispersion 31)

In a ground-joint flask equipped with stirrer and internal temperature measurement, 1.75 g (100% by weight of Acetic acid, 19.69 g (80% by weight) of Dimethylaminoethyl acrylate methyl chloride, 60.74 g (60% by weight) of Diallyl dimethyl ammonium chloride, 0.88 g (40% by weight) of Mersolat™ 40 (available from Lanxess Deutschland GmbH and 17.50 g demineralized water were added to the charge and heated up to 85° C. under stirring. Then 0.14 g (100% by weight) Iron (II) sulfate heptahydrate was added. Subsequently a feed of 52.5 g (10% by weight) hydrogen peroxide solution (initiator) and 28 g (100% by weight) Isopropanol (chain transfer agent) was started and feed over 150 min. Concomitantly a mixture of 48.44 g of Styrene, 11.55 g of Methyl methacrylate, 9.98 g of Methyl acrylate, 8.37 g of Acrylic acid and 0.09 g (40% by weight) of Mersolat™ 40 was also feed over 120 min. At the end of the initiator feed the batch was further stirred for 30 min (post polymerization) and afterwards a next initiator feed of 175 g (10% by weight) hydrogen peroxide solution started and feed over 120 min. At the same time a feed of 107.73 g of Acrylonitrile, 86.17 g of n-Butyl acrylate, 21.56 g of 2-Ethylhexyl Acrylate, 1.37 g of Terpinolen, 0.44 g (40% by weight) of Mersolat™ 40 and 525 g of demineralized water was also started and feed over 120 min. At the end of the both initiator and monomer feeds the reaction mixture was further stirred for 60 min(post polymerization), then the reaction mixture was cooled down to the room temperature. A finely divided polymer dispersion having a solids content of 28.3% by weight and a particle size of 106.6 nm was obtained.

Example 32 (Preparation of Dispersion 32)

In a ground-joint flask equipped with stirrer and internal temperature measurement, 0.7 g (100% by weight of Acetic acid, 19.69 g (80% by weight) of Dimethylaminoethyl acrylate methyl chloride, 60.74 g (60% by weight) of Diallyl dimethyl ammonium chloride, 0.44 g (40% by weight) of Mersolat™ 40 (available from Lanxess Deutschland GmbH and 17.50 g demineralized water were added to the charge and heated up to 85° C. under stirring. Then 0.14 g (100% by weight) Iron (II) sulfate heptahydrate was added. Subsequently a feed of 52.5 g (10% by weight) hydrogen peroxide solution (initiator) and 28 g (100% by weight) Isopropanol (chain transfer agent) was started and feed over 150 min. Concomitantly a mixture of 48.44 g of Styrene, 11.55 g of Methyl methacrylate, 9.98 g of Methyl acrylate, 8.37 g of Acrylic acid and 0.09 g (40% by weight) of Mersolat™ 40 was also feed over 120 min. At the end of the initiator feed the batch was further stirred for 30 min (post polymerization) and afterwards a next initiator feed of 175 g (10% by weight) hydrogen peroxide solution started and feed over 120 min. At the same time a feed of 107.73 g of Acrylonitrile, 86.17 g of n-Butyl acrylate, 21.56 g of 2-Ethylhexyl Acrylate, 1.37 g of Terpinolen, 0.18 g (40% by weight) of Mersolat™ 40 and 525 g of demineralized water was also started and feed over 120 min. At the end of the both initiator and monomer feeds the reaction mixture was further stirred for 60 min(post polymerization), then the reaction mixture was cooled down to the room temperature. A finely divided polymer dispersion having a solids content of 29.0% by weight and a particle size of 105.7 nm was obtained.

Example 33 (Preparation of Dispersion 33)

In a ground-joint flask equipped with stirrer and internal temperature measurement, 1.75 g (100% by weight of Acetic acid, 19.69 g (80% by weight) of Dimethylaminoethyl acrylate methyl chloride, 60.74 g (60% by weight) of Diallyl dimethyl ammonium chloride, 0.88 g (40% by weight) of Mersolat™ 40 (available from Lanxess Deutschland GmbH and 17.50 g demineralized water were added to the charge and heated up to 85° C. under stirring. Then 0.14 g (100% by weight) Iron (II) sulfate heptahydrate was added. Subsequently a feed of 52.5 g (10% by weight) hydrogen peroxide solution (initiator) and 21 g (100% by weight) Isopropanol (chain transfer agent) was started and feed over 150 min. Concomitantly a mixture of 48.44 g of Styrene, 11.55 g of Methyl methacrylate, 9.98 g of Methyl acrylate, 8.37 g of Acrylic acid and 0.44 g (40% by weight) of Mersolat™ 40 was also feed over 120 min. At the end of the initiator feed the batch was further stirred for 30 min (post polymerization) and afterwards a next initiator feed of 175 g (10% by weight) hydrogen peroxide solution started and feed over 120 min. At the same time a feed of 59.5 g of Styrene, 175 g of tert-Butyl acrylate, 0.44 g (40% by weight) of Mersolat™ 40 and 525 g of demineralized water was also started and feed over 120 min. At the end of the both initiator and monomer feeds the reaction mixture was further stirred for 60 min(post polymerization), then the reaction mixture was cooled down to the room temperature. A finely divided polymer dispersion having a solids content of 30.1% by weight and a particle size of 115.9 nm was obtained.

Example 34 (Preparation of Dispersion 34)

In a ground-joint flask equipped with stirrer and internal temperature measurement, 1.75 g (100% by weight of Acetic acid, 19.69 g (80% by weight) of Dimethylaminoethyl acrylate methyl chloride, 60.74 g (60% by weight) of Diallyl dimethyl ammonium chloride, 0.18 g (40% by weight) of Lutensol™ AT25 (available from BASF SE) and 17.50 g demineralized water were added to the charge and heated up to 85° C. under stirring. Then 0.14 g (100% by weight) Iron (II) sulfate heptahydrate was added. Subsequently a feed of 52.5 g (10% by weight) hydrogen peroxide solution (initiator) and 21 g (100% by weight) Isopropanol (chain transfer agent) was started and feed over 150 min. Concomitantly a mixture of 48.44 g of Styrene, 11.55 g of Methyl methacrylate, 9.98 g of Methyl acrylate, 8.37 g of Acrylic acid and 0.26 g (40% by weight) of Lutensol™ AT 25 was also feed over 120 min. At the end of the initiator feed the batch was further stirred for 30 min (post polymerization) and afterwards a next initiator feed of 175 g (10% by weight) hydrogen peroxide solution started and feed over 120 min. At the same time a feed of 59.5 g of Styrene, 175 g of tert-Butyl acrylate, 0.88 g (40% by weight) of Lutensol™ AT 25 and 525 g of demineralized water was also started and feed over 120 min. At the end of the both initiator and monomer feeds the reaction mixture was further stirred for 60 min(post polymerization), then the reaction mixture was cooled down to the room temperature. A finely divided polymer dispersion having a solids content of 30.4% by weight and a particle size of 122.6 nm was obtained.

Example 35 (Preparation of Dispersion 35)

In a ground-joint flask equipped with stirrer and internal temperature measurement, 1.75 g (100% by weight of Acetic acid, 10.94 g (80% by weight) of Dimethylaminoethyl acrylate methyl chloride, 60.74 g (60% by weight) of Diallyl dimethyl ammonium chloride, 0.18 g (40% by weight) of Mersolat™ 40 (available from Lanxess Deutschland GmbH and 17.50 g demineralized water were added to the charge and heated up to 85° C. under stirring. Then 0.14 g (100% by weight) Iron (II) sulfate heptahydrate was added. Subsequently a feed of 52.5 g (10% by weight) hydrogen peroxide solution (initiator) and 21 g (100% by weight) Isopropanol (chain transfer agent) was started and feed over 150 min. Concomitantly a mixture of 38.5 g of Styrene, 11.55 g of Methyl methacrylate, 9.98 g of Methyl acrylate, 8.37 g of Acrylic acid and 0.18 g (40% by weight) of Mersolat™ 40 was also feed over 120 min. At the end of the initiator feed the batch was further stirred for 30 min (post polymerization) and afterwards a next initiator feed of 175 g (10% by weight) hydrogen peroxide solution started and feed over 120 min. At the same time a feed of 133 g of Styrene, 69.3 g of tert-Butyl acrylate, 25.2 g of n-Butyl acrylate, 0.44 g (40% by weight) of Mersolat™ 40 and 525 g of demineralized water was also started and feed over 120 min. At the end of the both initiator and monomer feeds the reaction mixture was further stirred for 60 min(post polymerization), then the reaction mixture was cooled down to the room temperature. A finely divided polymer dispersion having a solids content of 28.4% by weight and a particle size of 101.9 nm was obtained.

Example 36 (Preparation of Dispersion 36)

In a ground-joint flask equipped with stirrer and internal temperature measurement, 1.75 g (100% by weight of Acetic acid, 10.94 g (80% by weight) of Dimethylaminoethyl acrylate methyl chloride, 60.74 g (60% by weight) of Diallyl dimethyl ammonium chloride, 0.18 g (40% by weight) of Mersolat™ 40 (available from Lanxess Deutschland GmbH and 17.50 g demineralized water were added to the charge and heated up to 85° C. under stirring. Then 0.14 g (100% by weight) Iron (II) sulfate heptahydrate was added. Subsequently a feed of 52.5 g (10% by weight) hydrogen peroxide solution (initiator) and 21 g (100% by weight) Isopropanol (chain transfer agent) was started and feed over 150 min. Concomitantly a mixture of 38.5 g of Styrene, 11.55 g of Methyl methacrylate, 9.98 g of Methyl acrylate, 8.37 g of Acrylic acid and 0.18 g (40% by weight) of Mersolat™ 40 was also feed over 120 min. At the end of the initiator feed the batch was further stirred for 30 min (post polymerization) and afterwards a next initiator feed of 175 g (10% by weight) hydrogen peroxide solution started and feed over 120 min. At the same time a feed of 133 g of Styrene, 69.3 g of tert-Butyl acrylate, 25.2 g of n-Butyl acrylate, 0.22 g (40% by weight) of Mersolat™ 40 and 525 g of demineralized water was also started and feed over 120 min. At the end of the both initiator and monomer feeds the reaction mixture was further stirred for 60 min(post polymerization), then the reaction mixture was cooled down to the room temperature. A finely divided polymer dispersion having a solids content of 29.0% by weight and a particle size of 100.9 nm was obtained.

Example 37 (Preparation of Dispersion 37)

In a ground-joint flask equipped with stirrer and internal temperature measurement, 5.25 g (100% by weight of Acetic acid, 45.77 g (60% by weight) of Diallyl dimethyl ammonium chloride, 0.18 g (40% by weight) of Lutensol™ AT 25 (available from BASF SE) and 35 g demineralized water were added to the charge and heated up to 85° C. under stirring. Then 0.14 g (100% by weight) Iron (II) sulfate heptahydrate was added. Subsequently a feed of 52.5 g (10% by weight) hydrogen peroxide solution (initiator) and 21 g (100% by weight) Isopropanol (chain transfer agent) was started and feed over 150 min. Concomitantly a mixture of 31.5 g of Styrene, 5.25 g of Dimethylaminoethyl methacrylate, 8.09 g of Methyl methacrylate, 6.65 g of Methyl acrylate, 5.95 g of Acrylic acid and 0.09 g (40% by weight) of Lutensol™ AT 25 was also feed over 120 min. At the end of the initiator feed the batch was further stirred for 30 min (post polymerization) and afterwards a next initiator feed of 175 g (10% by weight) hydrogen peroxide solution started and feed over 120 min. At the same time a feed of 161 g of Styrene, 87.5 g of tert-Butyl acrylate, 28 g of n-Butyl acrylate, 0.18 g (40% by weight) of Lutensol™ AT 25 and 525 g of demineralized water was also started and feed over 120 min. At the end of the both initiator and monomer feeds the reaction mixture was further stirred for 60 min(post polymerization), then the reaction mixture was cooled down to the room temperature. A finely divided polymer dispersion having a solids content of 27.6% by weight and a particle size of 105 nm was obtained.

Example 38 (Preparation of Dispersion 38)

In a ground-joint flask equipped with stirrer and internal temperature measurement, 14 g (100% by weight of Acetic acid, 45.77 g (60% by weight) of Diallyl dimethyl ammonium chloride, 0.18 g (40% by weight) of Lutensol™ AT 25 (available from BASF SE) and 35 g demineralized water were added to the charge and heated up to 85° C. under stirring. Then 0.14 g (100% by weight) Iron (II) sulfate heptahydrate was added. Subsequently a feed of 52.5 g (10% by weight) hydrogen peroxide solution (initiator) and 28 g (100% by weight) Isopropanol (chain transfer agent) was started and feed over 150 min. Concomitantly a mixture of 31.5 g of Styrene, 5.25 g of Dimethylaminoethyl methacrylate, 8.09 g of Methyl methacrylate, 6.65 g of Methyl acrylate, 5.95 g of Acrylic acid and 0.09 g (40% by weight) of Lutensol™ AT 25 was also feed over 120 min. At the end of the initiator feed the batch was further stirred for 30 min (post polymerization) and afterwards a next initiator feed of 175 g (10% by weight) hydrogen peroxide solution started and feed over 120 min. At the same time a feed of 161 g of Styrene, 105 g of tert-Butyl acrylate, 14 g of n-Butyl acrylate, 0.18 g (40% by weight) of Lutensol™ AT 25 and 525 g of demineralized water was also started and feed over 120 min. At the end of the both initiator and monomer feeds the reaction mixture was further stirred for 60 min (post polymerization), then the reaction mixture was cooled down to the room temperature. A finely divided polymer dispersion having a solids content of 29.7% by weight and a particle size of 104.5 nm was obtained.

Performance Testing of Polymer Dispersions 30 to 38 Produced in Examples 30 to 38 and Comparative Dispersion 1 of Comparative Example 1:

Polymer Dispersions 30 to 38 and Comparative Dispersions 1 and 2 were evaluated in exactly the same manner as for Polymer Dispersions 1 to 25, except that the size press liquor was applied at a speed of 4 m/min, using only one application cycle, and a drying temperature of 95° C. The doses of the polymer dispersions contained in the sizing press liquor were 0.45, 0.6 and 0.9 g/l.

The sizing and stability results for Polymer Dispersions 30 to 38 are shown in Table 3.

TABLE 3

| | Cobb60 Value [g/m$^2$] Amount Applied [g/l solid] | | | Stable dispersion at |
|---|---|---|---|---|
| | 0.45 | 0.6 | 0.9 | pH 7 at 25° C. |
| Comparative Dispersion 1 | 75 | 54 | 35 | Not pH stable |
| Dispersion 30 | 120 | 100 | 65 | pH stable |
| Dispersion 31 | 107 | 107 | 81 | pH stable |
| Dispersion 32 | 122 | 107 | 70 | pH stable |
| Dispersion 33 | 97 | 90 | 44 | pH stable |
| Dispersion 34 | 116 | 95 | 46 | pH stable |
| Dispersion 35 | 116 | 104 | 75 | pH stable |
| Dispersion 36 | 117 | 98 | 70 | pH stable |
| Dispersion 37 | 106 | 99 | 90 | pH stable |
| Dispersion 38 | 103 | 94 | 78 | pH stable |

Polymer Dispersions 30 to 38 and Comparative Dispersions 1 and 2 were evaluated in the same manner as given above except with the inclusion of alum at a dosage of 1 g alum solid per litre of starch solution such that the final size press liquors containing alum.

The sizing results for Polymer Dispersions 30 to 38 in size press liquors containing alum are shown in table 4. The doses of the polymer dispersions contained in the sizing press liquor were 0.3, 0.45 and 0.6 g/l.

TABLE 4

| | Cobb60 Value [g/m$^2$] Amount Applied [g/l solid] | | |
|---|---|---|---|
| | 0.3 | 0.45 | 0.6 |
| Comparative Dispersion 1 | 28 | 21 | 20 |
| Example 1 | 98 | 87 | 61 |
| Example 2 | 88 | 85 | 65 |
| Example 3 | 99 | 82 | 62 |
| Example 4 | 84 | 63 | 34 |
| Example 5 | 90 | 57 | 32 |
| Example 6 | 91 | 90 | 69 |
| Example 7 | 90 | 82 | 38 |
| Example 8 | 84 | 72 | 54 |
| Example 9 | 85 | 76 | 59 |

The invention claimed is:

1. A finely divided, cationic, aqueous polymer dispersion which is obtainable by emulsion polymerisation of ethylenically unsaturated monomers in an aqueous liquid comprising a cationic prepolymer as a dispersant, wherein
   the cationic prepolymer is prepared in a presence of at least one polymerisation initiator by polymerisation of
   (a) from 15 to 45% by weight of at least one ethylenically unsaturated monomer comprising at least one quaternary ammonium group;
   (b) from 5 to 80% by weight of at least one optionally substituted styrene;
   (c) from 0 to 50% by weight of at least one $C_{1-12}$ alkyl (meth) acrylate;
   (d) from 0 to 10% by weight of at least one ethylenically unsaturated monomer comprising an acid group;
   (e) from 0 to 10% by weight of at least one ethylenically unsaturated monomer comprising an amine group; and (f) from 0 to 20% by weight of at least one non-ionic ethylenically unsaturated monomer differing from (b), (c) and (e), a sum of (a)+(b)+(c)+(d)+(e)+(f) being 100% by weight, in a first emulsion polymerisation in a presence of at least one non-ionic emulsifier, and thereafter, in the aqueous liquid containing the cationic prepolymer, a second emulsion polymerisation is carried out, in the presence of at least one polymerisation initiator, of a monomer mixture comprising (i) from 10 to 70% by weight of at least one of an optionally substituted styrene or (meth) acrylonitrile;

(ii) from 30 to 90% by weight of at least one $C_{1-18}$ alkyl (meth) acrylate;

(iii) from 0 to 30% by weight of at least one vinyl ester of linear or branched $C_{1-30}$ carboxylic acids; and (iv) from 0 to 30% by weight of at least one non-ionic ethylenically unsaturated monomer differing from (i), (ii) and (iii), a sum of (i)+(ii)+(iii)+(iv) being 100% by weight, the first emulsion polymerisation and/or the second emulsion polymerisation is optionally carried out in a presence of from 0 to 10% by weight of at least one polymerisation regulator, and the aqueous polymer dispersion comprises dispersed particles having a mean particle size of from about 5 to about 250 nm.

2. The finely divided, cationic, aqueous polymer dispersion according to claim 1, wherein the cationic prepolymer is obtainable by polymerisation of (a) from 20 to 45% by weight of at least one ethylenically unsaturated monomer comprising at least one quaternary ammonium group;

(b) from 15 to 75% by weight of styrene;

(c) from 0 to 50% by weight of at least one $C_{1-12}$ alkyl (meth) acrylate;

(d) from 0 to 10% by weight of acrylic acid and/or methacrylic acid; and (e) from 0 to 10% by weight of at least one of N,N-dimethylaminopropylmethacrylamide, N,N-dimethylaminoethyl methacrylate and N,N-dimethylaminoethyl acrylate.

3. The finely divided, cationic, aqueous polymer dispersion according to claim 1, wherein the cationic prepolymer is obtainable by polymerisation of (a) from 20 to 45% by weight of at least one ethylenically unsaturated monomer comprising at least one quaternary ammonium group, selected from the group consisting of a quaternary ammonium salt of dialkyl amino alkyl acrylate, a quaternary ammonium salt of dialkyl amino alkyl methacrylate, a diallyl dimethyl ammonium salt and a quaternary ammonium salt of vinyl imidazole;

(b) from 15 to 60% by weight of styrene;

(c) from 0 to 50% by weight of at least one $C_1$-$C_4$-alkyl acrylate and/or at least one $C_1$-$C_4$-alkyl methacrylate; and (d) from 0 to 10% by weight of acrylic acid and/or methacrylic acid.

4. The finely divided, cationic, aqueous polymer dispersion according to any of the claim 1, wherein, in the second emulsion polymerisation, a monomer mixture comprising (i) from 10 to 60% by weight of styrene;

(ii) from 30 to 90% by weight of n-butyl acrylate, tert-butyl acrylate or mixtures of n-butyl acrylate and tert-butyl acrylate is subjected to the emulsion polymerisation.

5. The finely divided, cationic, aqueous polymer dispersion according to claim 1, wherein the first emulsion polymerisation and/or the second emulsion polymerisation is carried out in the presence of 0.1 to 10% by weight of at least one polymerisation regulator.

6. The finely divided, cationic, aqueous polymer dispersion according to claim 5, wherein the polymerisation regulator used is selected from the group consisting of mercaptans; thioglycolic acid; carbon tetrabromide; and terpenes.

7. The finely divided, cationic, aqueous polymer dispersion according to claim 1, wherein the at least one non-ionic emulsifier present in the first emulsion polymerisation is or comprises a compound having the formula

R'—O—(CH$_2$—CH$_2$—O—)$_x$H in which R' is an alkyl group of at least 12 carbon atoms, and x is at least 12.

8. The finely divided, cationic aqueous polymer dispersion according to claim 1, wherein the at least one nonionic emulsifier present in the first emulsion polymerisation is or comprises a compound having the formula

R"(—O—CH$_2$—CH$_2$)$_x$M in which R" is an alkyl group of at least one carbon atom, x is an integer, and M is a polymerisable moiety comprising an ethylenically unsaturated group.

9. A process for the preparation of a finely divided, cationic, aqueous polymer dispersion which is obtainable by emulsion polymerisation of ethylenically unsaturated monomers in an aqueous liquid comprising a cationic prepolymer as a dispersant, wherein the cationic prepolymer is prepared in a presence of at least one polymerisation initiator by polymerisation of (a) from 15 to 45% by weight of at least one ethylenically unsaturated monomer comprising at least one quaternary ammonium group;

(b) from 5 to 80% by weight of at least one optionally substituted styrene;

(c) from 0 to 50% by weight of at least one $C_{1-12}$ alkyl (meth) acrylate;

(d) from 0 to 10% by weight of at least one ethylenically unsaturated monomer comprising an acid group;

(e) from 0 to 10% by weight of at least one ethylenically unsaturated monomer comprising an amine group; and (f) from 0 to 20% by weight of at least one non-ionic ethylenically unsaturated monomer differing from (b), (c) and (e), a sum of (a)+(b)+(c)+(d)+(e)+(0 being 100% by weight, in a first emulsion polymerisation in a presence of at least one non-ionic emulsifier, and thereafter, in the aqueous liquid containing the cationic prepolymer, a second emulsion polymerisation is carried out, in a presence of at least one polymerisation initiator, of a monomer mixture comprising (i) from 10 to 70% by weight of at least one of an optionally substituted styrene or (meth) acrylonitrile;

(ii) from 30 to 90% by weight of at least one C1-18 alkyl (meth) acrylate;

(iii) from 0 to 30% by weight of at least one vinyl ester of linear or branched C1-30 carboxylic acids; and (iv) from 0 to 30% by weight of at least one non-ionic ethylenically unsaturated monomer differing from (i), (ii) and (iii), a sum of (i)+(ii)+(iii)+(iv) being 100% by weight,
the first emulsion polymerisation and/or the second emulsion polymerisation is optionally carried out in a presence of from 0 to 10% by weight of at least one polymerisation regulator, and
the aqueous polymer dispersion comprises dispersed particles having a mean particle size of from about 5 to about 250 nm.

10. A sizing agent for paper, board and cardboard, the sizing agent comprising a finely divided, cationic, aqueous polymer dispersion which is obtainable by emulsion polymerisation of ethylenically unsaturated monomers in an aqueous liquid comprising a cationic prepolymer as a dispersant, wherein
the cationic prepolymer is prepared in a presence of at least one polymerisation initiator by polymerisation of
(a) from 15 to 45% by weight of at least one ethylenically unsaturated monomer comprising at least one quaternary ammonium group;
(b) from 5 to 80% by weight of at least one optionally substituted styrene;
(c) from 0 to 50% by weight of at least one $C_{1-12}$ alkyl (meth) acrylate;
(d) from 0 to 10% by weight of at least one ethylenically unsaturated monomer comprising an acid group;
(e) from 0 to 10% by weight of at least one ethylenically unsaturated monomer comprising an amine group; and
(f) from 0 to 20% by weight of at least one non-ionic ethylenically unsaturated monomer differing from (b), (c) and (e),
a sum of (a)+(b)+(c)+(d)+(e)+(f) being 100% by weight,
in a first emulsion polymerisation in a presence of at least one non-ionic emulsifier, and thereafter, in the aqueous liquid containing the cationic prepolymer, a second emulsion polymerisation is carried out, in the presence of at least one polymerisation initiator, of a monomer mixture comprising
(i) from 10 to 70% by weight of at least one of an optionally substituted styrene or (meth) acrylonitrile;
(ii) from 30 to 90% by weight of at least one $C_{1-18}$ alkyl (meth) acrylate;
(iii) from 0 to 30% by weight of at least one vinyl ester of linear or branched $C_{1-30}$ carboxylic acids; and
(iv) from 0 to 30% by weight of at least one non-ionic ethylenically unsaturated monomer differing from (i), (ii) and (iii),
a sum of (i)+(ii)+(iii)+(iv) being 100% by weight,
the first emulsion polymerisation and/or the second emulsion polymerisation is optionally carried out in a presence of from 0 to 10% by weight of at least one polymerisation regulator, and
the aqueous polymer dispersion comprises dispersed particles having a mean particle size of from about 5 to about 250 nm.

11. The finely divided, cationic aqueous polymer dispersion according to claim 1, wherein the at least one nonionic emulsifier present in the first emulsion polymerisation is or comprises a compound selected from a methacrylic ester of an ethoxylated C16-C18 fatty alcohol and a methoxy polyethylene glycol 350 methacrylate.

* * * * *